(12) United States Patent
Xie

(10) Patent No.: US 12,395,627 B2
(45) Date of Patent: Aug. 19, 2025

(54) INTRA PREDICTION METHOD AND DECODER

(71) Applicant: GUANGDONG OPPO MOBILE TELECOMMUNICATIONS CORP., LTD., Dongguan (CN)

(72) Inventor: Zhihuang Xie, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 15 days.

(21) Appl. No.: 18/643,383

(22) Filed: Apr. 23, 2024

(65) Prior Publication Data
US 2024/0275955 A1    Aug. 15, 2024

Related U.S. Application Data

(63) Continuation of application No. PCT/CN2021/127333, filed on Oct. 29, 2021.

(51) Int. Cl.
  *H04N 19/11* (2014.01)
(52) U.S. Cl.
  CPC .................. *H04N 19/11* (2014.11)
(58) Field of Classification Search
  CPC .... H04N 19/11; H04N 19/176; H04N 19/593; H04N 19/105; H04N 19/159
  See application file for complete search history.

(56) References Cited

U.S. PATENT DOCUMENTS

| | | | |
|---|---|---|---|
| 2019/0166370 A1* | 5/2019 | Xiu | H04N 19/176 |
| 2020/0296356 A1* | 9/2020 | Mora | G06N 7/01 |
| 2022/0141453 A1 | 5/2022 | Huo et al. | |

FOREIGN PATENT DOCUMENTS

| | | |
|---|---|---|
| WO | 2021114102 A1 | 6/2021 |

OTHER PUBLICATIONS

Mohsen Abdoli et al. ; "Non-CE3: Decoder-side Intra Mode Derivation with Prediction Fusion Using Planar (JVET-O0449-v2)", Joint Video Experts Team (JVET) of ITU-T SG 16 WP 3 and ISO/IEC JTC 1/SC 29/WG 11 15th Meeting, Jul. 4, 2019 (Jul. 4, 2019) (Year: 2019).*

Wang, Yang et al. ; "EE2-related: Template-based intra mode derivation using MPMs (JVET-V0098-v2)", Joint Video Experts Team (JVET) of ITU-T SG 16 WP 3 and ISO/IEC JTC 1/SC 29 22nd Meeting, Apr. 22, 2021, (Apr. 22, 2021) (Year: 2021).*

(Continued)

*Primary Examiner* — Dramos Kalapodas
(74) *Attorney, Agent, or Firm* — BAYES PLLC

(57) ABSTRACT

Intra prediction methods and a decoder are provided. The method includes: a bitstream is parsed, and a target prediction mode of a current picture block in a current picture sequence is determined, the target prediction mode is a first prediction mode or a second prediction mode, the first prediction mode is an intra prediction mode for the decoder to derive the current picture block by using a manner of an encoder deriving the intra prediction mode, and the second prediction mode is a prediction mode combining the first prediction mode with an MIP mode; and intra prediction on the current picture block is performed based on the target prediction mode, to obtain a target prediction block of the current picture block.

20 Claims, 4 Drawing Sheets

(56) References Cited

OTHER PUBLICATIONS

International Search Report in the international application No. PCT/CN2021/127333, mailed on Aug. 1, 2022. 9 pages with English translation.
Written Opinion of the International Search Authority in the international application No. PCT/CN2021/127333, mailed on Aug. 1, 2022. 11 pages with English translation.
Mohsen Abdoli et al. "Non-CE3: Decoder-side Intra Mode Derivation with Prediction Fusion Using Planar (JVET-O0449-v2)", Joint Video Experts Team (JVET) of ITU-T SG 16 WP 3 and ISO/IEC JTC 1/SC 29/WG 11 15th Meeting, Jul. 4, 2019 (Jul. 4, 2019), entire document. 9 pages.
Wang, Yang et al. "EE2-related: Template-based intra mode derivation using MPMs (JVET-V0098-v2)", Joint Video Experts Team (JVET) of ITU-T SG 16 WP 3 and ISO/IEC JTC 1/SC 29 22nd Meeting, Apr. 22, 2021, (Apr. 22, 2021), entire document. 4 pages.

* cited by examiner

INTRA PREDICTION METHOD AND DECODER

CROSS-REFERENCE TO RELATED APPLICATION

This application is a continuation of International Application No. PCT/CN2021/127333 filed on Oct. 29, 2021, the disclosure of which is hereby incorporated by reference in its entirety.

BACKGROUND

Digital video compression technologies mainly compress huge digital image and video data to facilitate transmission, storage, etc. With the sharp increase of Internet videos and people's increasing requirements on definitions of the videos, although existing digital video compression standards can implement video decompression technologies, it is still necessary to pursue better digital video decompression technologies at present, to improve prediction effect and decompression performance of a decoder based on improving decompression efficiency of the decoder.

SUMMARY

Embodiments of the disclosure provide intra prediction methods and a decoder.

In an aspect, the disclosure provides an intra prediction method, the method is applicable to a decoder, and the method includes the following operations.

A bitstream is parsed, and a target prediction mode of a current picture block in a current picture sequence is determined, the target prediction mode is a first prediction mode or a second prediction mode, the first prediction mode is an intra prediction mode for the decoder to derive the current picture block by using a manner of an encoder deriving the intra prediction mode, and the second prediction mode is a prediction mode combining the first prediction mode with a Matrix based Intra Prediction (MIP) mode.

Intra prediction is performed on the current picture block based on the target prediction mode, to obtain a target prediction block of the current picture block.

In another aspect, the disclosure provides an intra prediction method, the method is applicable to an encoder, and the method includes the following operations.

A target prediction mode of a current picture block in a current picture sequence is determined, the target prediction mode is a first prediction mode or a second prediction mode, the first prediction mode is an intra prediction mode for a decoder to derive the current picture block by using a manner of the encoder deriving the intra prediction mode, and the second prediction mode is a prediction mode combining the first prediction mode with an MIP mode.

Intra prediction is performed on the current picture block based on the target prediction mode, to obtain a target prediction block of the current picture block.

In another aspect, an embodiment of the disclosure provides a decoder, the decoder is configured to perform the method in the above first aspect or various implementations thereof. Specifically, the decoder includes a functional unit configured to perform the method in the above first aspect or various implementations thereof.

DETAILED DESCRIPTION

Figure 1:
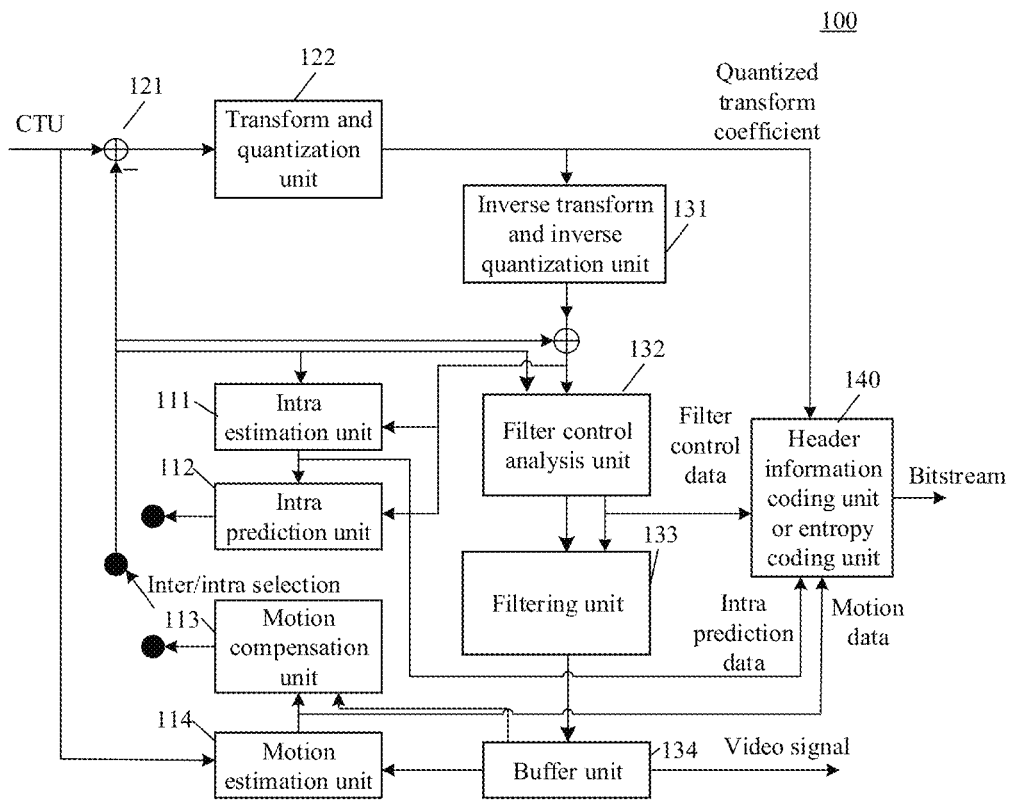
FIG. 1 is a schematic block diagram of an encoding framework provided in an embodiment of the disclosure.

Solutions provided in the embodiments of the disclosure may be applied to the field of digital video coding technology, such as the field of encoding and decoding pictures, the field of encoding and decoding videos, the field of encoding and decoding videos with hardware, the field of encoding and decoding videos with dedicated circuits, and the field of encoding and decoding videos in real-time. Of course, the solutions provided in the embodiments of the disclosure may also be combined with an Audio Video coding Standard (AVS), a second-generation AVS standard (AVS2) or a third-generation AVS standard (AVS3). The AVS includes, but is not limited to H.264/Audio Video Coding (AVC) standard, H.265/High Efficiency Video Coding (HEVC) standard and H.266/Versatile Video Coding (VVC) standard. The solutions provided in the embodiments of the disclosure may even be combined with an Enhanced Compression Model (ECM) which has surpassed H.266/VVC coding model. The ECM began to receive newer and more efficient compression algorithms based on version 10.0 of VVC's reference software test platform (VVC TEST MODEL (VTM)).

The solutions provided in the embodiments of the disclosure may also be used to perform lossy compression on pictures, and may also be used to perform lossless compression on pictures, which is not specifically limited in the disclosure. The lossless compression may be visually lossless compression or mathematically lossless compression.

In a digital video coding process, an encoder reads unequal pixels of luma components and of chroma components for an original picture sequences having different colour formats, that is, the encoder reads a black-and-white picture or a colour picture, and then encodes the black-and-white picture or the colour picture. The black-and-white picture may include pixels of luma component, and the colour picture may include pixels of chroma component. Optionally, the colour picture may also include pixels of luma component. The colour format of the original picture sequence may be a luma-chroma (YCbCr, YUV) format or a Red-Green-Blue (RGB) format, etc. With regard to the YUV format, Y represents luma, Cb (U) represents a blue colour difference, Cr (V) represents a red colour difference, and U and V represent chroma, which are used to describe colour difference information.

After reading a black-and-white picture or a colour picture, the encoder divides the picture into block data and encodes the block data. The block data may be a Coding Tree Unit (CTU) or a Coding Unit (CU), one CTU may be further divided into several CUs, a CU may be a rectangular block or a square block, and a CU may also be divided into a prediction unit (PU) and a transform unit (TU), etc. That is, the encoder may encode based on CTU or CU.

The encoder is also commonly referred to as a hybrid coding framework, and the hybrid coding framework may include various modules such as a prediction module, a transform module, a quantization module, a entropy coding module, an in-loop filter module, etc. The prediction module includes an intra prediction module and an inter prediction module. The inter prediction module includes a motion estimation module and a motion compensation module. Since there is a strong correlation between adjacent pixels in a picture of the video, an intra prediction method is used in video encoding and decoding technologies, to eliminate spatial redundancy between adjacent pixels; that is, the intra prediction module refers to only information of the same picture to predict pixel information in a current divided block. Since there is a strong correlation between adjacent pictures of the video, an inter prediction method is used in video encoding and decoding technologies, to eliminate temporal redundancy between adjacent pictures, thereby improving coding efficiency. That is, the inter prediction module may refer to picture information of different pictures, use motion estimation to search motion vector information which best matches the current divided block, and predict pixel information in the current divided block. The transform module transforms a predicted picture block into a frequency domain, redistributes energy, and is combined with quantization to remove information which is not sensitive to human eyes, which is intended to eliminate visual redundancy. The entropy coding module may eliminate character redundancy based on a current context model and probability information of a binary bitstream.

In order to facilitate understanding, a brief introduction is made first to an encoding framework provided in the disclosure.

FIG. 1 is a schematic block diagram of an encoding framework 100 provided in an embodiment of the disclosure.

As an example, the encoding framework 100 may be applied to picture data in the luma-chroma (YCbCr, YUV) format. For example, a ratio of YUV may be 4:2:0, 4:2:2 or 4:4:4, Y represents luma, Cb (U) represents blue chroma, Cr (V) represents red chroma, and U and V represent chroma, which are used to describe colour and saturation. For example, in terms of colour formats, 4:2:0 represents that every 4 pixels have 4 luma components and 2 chroma components (YYYYCbCr), 4:2:2 represents that every 4 pixels have 4 luma components and 4 chroma components (YYYYCbCrCbCr), 4:4:4 represents full pixel display (YYYYCbCrCbCrCbCrCbCr).

For example, the encoding framework 100 may read unequal pixels including luma components and chroma components, for digital videos having different colour formats. In other words, the encoding framework 100 may read a black-and-white picture or a colour picture, that is, a to-be-coded current picture. After reading the current picture, the encoding framework 100 divides the current picture into block data, and encodes based on the block data. For example, after reading the current picture, the encoding framework 100 may divide the current picture into several CTUs, one CTU may be further divided into several CUs, a CU may be a rectangular block or a square block. That is, the encoding framework 100 may encode based on CTU or CU.

As illustrated in FIG. 1, the encoding framework 100 may include an intra estimation unit 111, an intra prediction unit 112, a motion compensation unit 113, a motion estimation unit 114, a residual unit 121, a transform and quantization unit 122, and a header information coding unit or entropy coding unit 140. The encoding framework 100 may also be referred to as a hybrid framework coding mode.

In other words, in the encoding framework 100, the intra estimation unit 111 and the intra prediction unit 112 may predict a current picture block with reference to adjacent picture blocks of a to-be-coded picture, to output a prediction block. Or, the motion compensation unit 113 and the motion estimation unit 114 may predict the current picture block with reference to adjacent picture blocks of the to-be-coded picture, to output the prediction block. The residual unit 121 may calculate a residual block based on the prediction block and the to-be-coded current picture block, the residual block is a difference between the prediction block and the to-be-coded current picture block, and the residual block may also be referred to as residual information. The residual block is transformed and quantized by the transform and quantization unit 122 or processed otherwise, which may remove information which is not sensitive to human eyes, to eliminate visual redundancy. Optionally, a residual block before being subject to transform and quantization by the transform and quantization unit 122 may be referred to as a time domain residual block, and a time domain residual block after being subject to transform and quantization by the transform and quantization unit 122 may be referred to as a frequency residual block or a frequency domain residual block. After receiving a quantized transform coefficient output by the transform and quantization unit 122, the header information coding unit or entropy coding unit 140 may output a target bitstream based on the quantized transform coefficient and intra prediction data output by the intra estimation unit 111 and the intra prediction unit 112 or motion data output by the motion compensation unit 113 and the motion estimation unit 114. For example, the header information coding unit or entropy coding unit 140 may eliminate character redundancy according to a target context model and probability information of the binary bitstream. For example, the header information coding unit or entropy coding unit 140 may be used in Context Adaptive Binary Arithmetic entropy Coding (CABAC).

After a decoder receives and parses the bitstream, the time domain residual block is obtained through inverse transform and inverse quantization or other operations, and a reconstruction block may be obtained after superimposing the prediction block obtained by prediction of the decoder onto the time domain residual block. Optionally, in the disclosure, the current picture block may also be referred to as an original picture block or a to-be-coded picture block, the prediction block may also be referred to as a prediction picture block or an picture prediction block, and the reconstruction block may also be referred to as a reconstruction picture block or an picture reconstruction block. Furthermore, with regard to the encoder, the current picture block may also be referred to as a target coding block or a target coding picture block, and with regard to the decoder, the current picture block may also be referred to as a target coding block or a target coding picture block.

Optionally, the current picture block may be a target CTU or a target CU.

The intra estimation unit 111 and the intra prediction unit 112 may be used in intra prediction, and intra prediction refers to only information of the same picture to predict pixel information in the current picture block, to eliminate spatial redundancy. The picture used by intra prediction may be an I picture. The motion compensation unit 113 and the motion estimation unit 114 may be used in inter prediction, and inter prediction may refer to image information of different frames, and use motion estimation to search motion vector information which best matches the current picture block, to eliminate temporal redundancy. The picture used by inter prediction may be a P picture and/or a B picture, the P picture refers to a forward prediction picture, and the B picture refers to a bi-directional prediction picture.

Taking an intra prediction process as an example, the current picture block cannot refer to information of different pictures, and may only be predicted by using adjacent picture blocks of the same picture as reference information.

For example, according to a coding order from left to right and from top to bottom, the current picture block may take an upper left picture block, an upper picture block and a left picture block as reference information, to predict the current picture block, and the current picture block is also used as reference information of a next picture block, thus the whole picture may be predicted in this way. If an input digital video is in a colour format, such as a YUV 4:2:0 format, every 4 pixel points of each picture of the digital video are composed of 4 Y components and 2 UV components, and the encoding framework 100 may encode the Y components and the UV components respectively. Similarly, the decoder may also decode correspondingly according to the format.

For another example, intra prediction may predict the target coding block by using an angular prediction mode and a non-angular prediction mode, to obtain the prediction block, and select an optimal prediction mode for the current picture block according to rate distortion information calculated based on the prediction block and the current picture block, and transmit the prediction mode to the decoder through the bitstream. The decoder parses out the prediction mode, predicts and obtains a prediction block of the target decoding block, and superimposes it onto the time domain residual block obtained through transmission on the bitstream, to obtain the reconstruction block. Optionally, the non-angular prediction mode may include a mean mode and a planar mode. Optionally, the angular prediction mode may include various prescribed modes of digital video coding.

Taking H series of the international digital video coding standard as an example, H.264/AVC standard involves 8 angular prediction modes and 1 non-angular prediction mode; H.265/HEVC standard involves 33 angular prediction modes and 2 non-angular prediction modes; H.266/VVC standard involves 67 prediction modes, which includes 2 non-angular prediction modes and extends angular modes from 33 angular modes in H.265 to 65 angular modes. Undoubtedly, with the increase of angular modes, intra prediction will be more accurate, and will better conform to requirements of development of high-definition and ultra-high-definition digital video.

In other words, the angular prediction modes and the non-angular prediction modes involved in the embodiments of the disclosure may also be new prediction modes defined with the update of standards.

It should be understood that after receiving the target bitstream, the decoder obtains the time domain residual block and the prediction block based on the target bitstream, then may construct the reconstruction block based on the time domain residual block and the prediction block, and filters the reconstruction block, thus may generate a decoded picture.

As illustrated in FIG. 1, the encoding framework 100 may further include an inverse transform and inverse quantization unit 131, a filter control analysis unit 132, a filtering unit 133, and a buffer unit 134. Equivalently, a decoder is set in the encoding framework 100. Therefore, the prediction unit 100 may perform intra or inter prediction on the target picture based on an existing reference picture, which may ensure that the encoder and the decoder understand the reference picture consistently.

In other words, the encoder replicates a processing loop of the decoder, and may produce the same prediction as the decoder. Specifically, the quantized transform coefficient is inversely extended and inversely transformed by the inverse transform and inverse quantization unit 131, to replicate an approximate residual signal of the decoder. After the approximate residual signal is added to the prediction block, they may pass through the filtering unit 133, to smoothly filter out impacts such as block effects induced by block-based processes and quantization, etc. The picture block output by the filtering unit 133 may be stored in the buffer unit 134 of the decoded picture, to be used in prediction of subsequent pictures.

It should be noted that network structures of the filtering unit 133 on the luma component and the chroma component may be different.

For example, the network structure of the luma component may be composed of parts such as a residual layer, a convolutional layer, an activation layer, a skip connection, etc. The residual layer may be composed of two convolutional layers, an activation function (ReLU) activation layer, and a residual jump connection. Furthermore, the network structure of the luma component may further include a global residual jump connection. The jump connection may allow the network to focus on learning residuals, to accelerate a convergence process of the network.

For another example, considering that the luma component contains more visual information, in the disclosure, the luma component may be used to guide filtering of the chroma component, to improve reconstruction quality of the chroma component. For example, a main framework of the network of the chroma component may be similar to that of the luma component, and composed of a residual layer, a convolutional layer, an activation layer, a pooling layer, and a skip connection. Optionally, the chroma component may be up-sampled first, to ensure that resolution of the luma component is consistent with resolution of the chroma component. Optionally, adjacent pixels (Nearest Neighbor) may be directly copied to increase the resolution of the chroma component and avoid introducing other noises during up-sampling. After the luma component and the chroma component pass through the convolutional layer and the activation layer respectively, they may be merged based on an obtained feature map, and subsequent operations may be completed. At an end of a neural network, the chroma component is down-sampled by using the pooling layer.

It should be understood that FIG. 1 is only an example of the disclosure, and should not be construed as limitation to the disclosure.

For example, the encoding framework 100 may further include an in-loop filter unit, and the in-loop filter unit may include a deblocking filter (DBF) and a Sample Adaptive Offset filter (SAO). The function of the DBF is to remove a block effect, and the function of the SAO is to remove a ringing effect.

In other words, the encoding framework 100 may use an in-loop filter algorithm based on a neural network, to improve video compression efficiency. In other words, the encoding framework 100 may be a video coding hybrid framework based on a deep learning neural network. For example, in the encoding framework 100, a model based on a Convolutional Neural Network (CNN) may be used based on the DBF and the SAO, to infer and calculate a result after pixel filtering.

The encoder needs to divide a picture into blocks, use intra prediction or inter prediction for a current block to generate a prediction block of the current block, subtract the prediction block from an original picture block of the current block to obtain a residual block, transform and quantize the residual block to obtain a quantization coefficient matrix, perform entropy coding on the quantization coefficient matrix, and write an encoding result into a bitstream. At the decoder side, on one hand, the decoder also needs to use intra prediction or inter prediction for the current block to generate the prediction block of the current block; on the other hand, the decoder needs to parse the bitstream to obtain the quantization coefficient matrix, perform inverse quantization and inverse transform on the quantization coefficient matrix to obtain the residual block, and add the prediction block to the residual block to obtain a reconstruction block. The reconstruction block forms a reconstruction picture, and in-loop filtering is performed on the reconstruction picture based on the picture or based on the block, to obtain a decoded picture. It should be noted that the encoder also needs to perform operations similar to those of the decoder, to obtain the decoded picture. The decoded picture may be used as a reference picture for inter prediction of subsequent frames. Block division information determined by the encoder, and mode information or parameter information such as prediction, transform, quantization, entropy coding, in-loop filtering or the like, need to be written into the bitstream if necessary. The decoder determines, through parsing and analyzing according to existing information, the block division information determined by the encoder and the mode information or parameter information such as prediction, transform, quantization, entropy coding, in-loop filtering or the like which are the same as those of the encoder, to ensure the decoded picture obtained by the encoder is the same as the decoded picture obtained by the decoder. The decoded picture obtained by the encoder is commonly also referred to as the reconstruction picture. The current block may be divided into PUs during prediction, the current block may be divided into TUs during transform, and division of PUs may be different from that of TUs. The above descriptions are a basic process of the video encoder and decoder in the block-based hybrid coding framework. With the development of technologies, some modules or operations of the framework or workflow may be optimized. The current block may be a current CU, or a current PU, etc.

Figure 2:
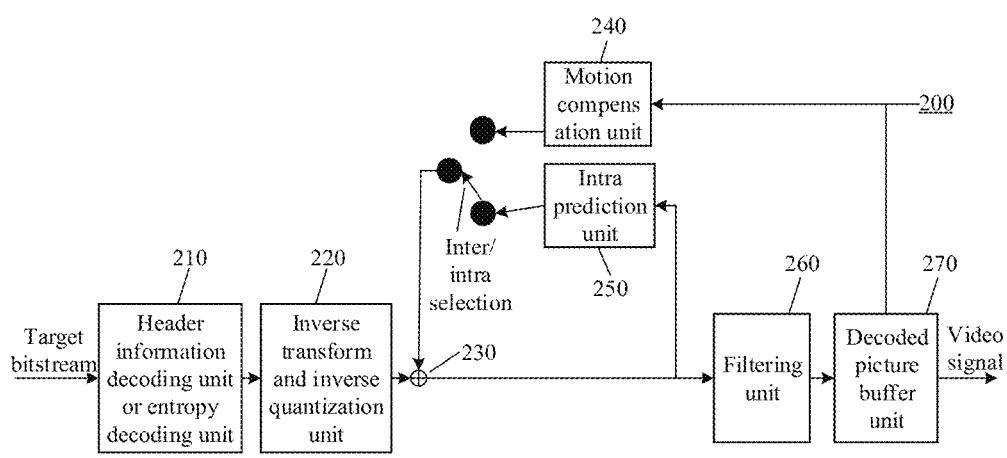
FIG. 2 is a schematic block diagram of a decoding framework provided in an embodiment of the disclosure.

FIG. 2 is a schematic block diagram of a decoding framework 200 provided in an embodiment of the disclosure.

As illustrated in FIG. 2, the decoding framework 200 may include a header information decoding unit or entropy decoding unit 210, an inverse transform and inverse quantization unit 220, a residual unit 230, a motion compensation unit 240, an intra prediction unit 250, a filtering unit 260, and a decoded picture buffer unit 270.

For example, after the header information decoding unit or entropy decoding unit 210 receives and parses a target bitstream to obtain a prediction block and a frequency domain residual block, inverse transform and inverse quantization or other operations are perform by the inverse transform and inverse quantization unit 220 on the frequency domain residual block, so that a time domain residual block may be obtained, and the residual unit 230 superimposes a prediction block predicted by the motion compensation unit 240 or the intra prediction unit 250 onto the time domain residual block being subject to the inverse transform and inverse quantization performed by the inverse transform and inverse quantization unit 220, so that a reconstruction block may be obtained. For example, the motion compensation unit 240 or the intra prediction unit 250 may obtain the prediction block by decoding header information of the target bitstream.

In order to facilitate understanding solutions provided in the disclosure, three related intra prediction technologies are introduced below.

(1) Decoder Side Intra Mode Derivation (DIMD) Prediction Mode

Figure 3:
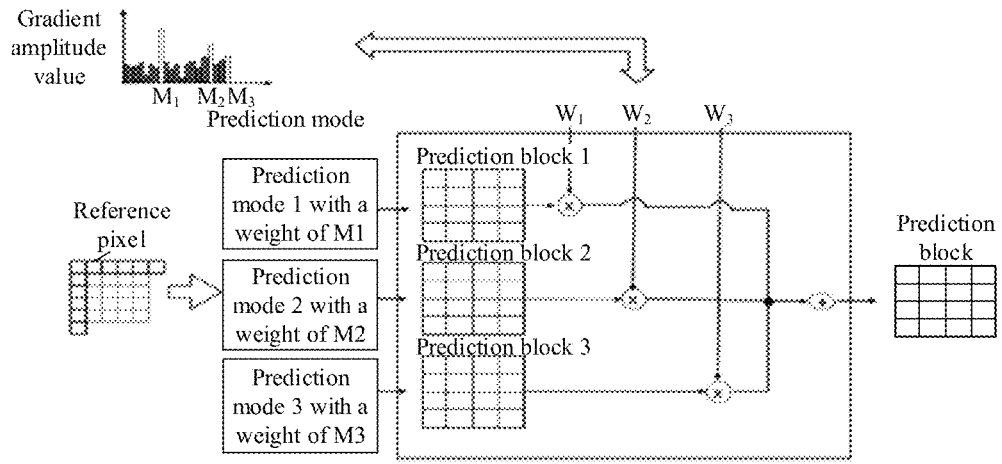
FIG. 3 is a schematic diagram of a Decoder side Intra Mode Derivation (DIMD) prediction mode provided in an embodiment of the disclosure.

A main core point of the DIMD prediction mode lies in the intra prediction mode, the decoder uses the same method as that of the encoder to derive the intra prediction mode, to avoid transmitting an intra prediction mode index of the current CU in the bitstream, and achieve a purpose of saving bit overhead. FIG. 3 is a schematic diagram of a DIDM prediction mode provided in an embodiment of the disclosure. As illustrated in FIG. 3, specific processes of the DIDM prediction mode may be divided into two main operations as follows.

Operation 1: Derivation of a Prediction Mode

The encoder and the decoder use the same prediction mode strength calculation method. Taking ECM2.0 as an example, the encoder uses a Sobel operator to count a histogram of gradients in each prediction mode; an active area is composed of three rows of adjacent reconstruction samples above the current block, three columns of adjacent reconstruction samples at the left of the current block, and an adjacent reconstruction sample corresponding to the upper left of the current block; the histogram of gradients of the foregoing L-shaped area is calculated, so that a prediction mode 1 corresponding to a maximum amplitude in the histogram and a prediction mode 2 corresponding to a second maximum amplitude in the histogram may be obtained. The decoder derives the prediction mode 1 and the prediction mode 2 with the same operations.

Operation 2: Derivation of a Prediction Block.

The encoder and the decoder use the same manner of deriving prediction blocks to obtain a current prediction block. Taking ECM2.0 as an example, the encoder determines two conditions as follows.

1. Gradient of the prediction mode 2 is not 0;
2. Neither the prediction mode 1 nor the prediction mode 2 is a planar mode or a DC prediction mode.

If the above two conditions are not met simultaneously, the current prediction block uses only the prediction mode 1 to calculate a prediction sample value of the current block, that is, an ordinary prediction process is applied to the prediction mode 1; otherwise, that is, if the above two conditions are met, the current prediction block will use a weighted and averaged manner to derive the current prediction block. A specific method is as follows. The planar mode occupies ⅓ of a weighted weight, and the remaining ⅔ of the weighted weight is a total weight of the prediction mode 1 and the prediction mode 2. For example, a gradient amplitude value of the prediction mode 1 is divided by a sum of the gradient amplitude value of the prediction mode 1 and a gradient amplitude value of the prediction mode 2, and a result therefrom is used as a weighted weight of the prediction mode 1; the gradient amplitude value of the prediction mode 2 is divided by the sum of the gradient amplitude value of the prediction mode 1 and the gradient amplitude value of the prediction mode 2, and a result therefrom is used as a weighted weight of the prediction mode 2; finally, prediction blocks obtained based on the above three prediction modes, that is, a prediction block 1, a prediction block 2 and a prediction block 3 obtained based on the planar mode, the prediction mode 1 and the prediction mode 2 respectively are weighted and averaged, to obtain the prediction block of the current CU. The decoder obtains the prediction block with the same operations.

In other words, specific weights in the above operation 2 are calculated as follows.

$$Weight(PLANAR) = 1/3$$

$$Weight(mode1) = 2/3 * (amp1/(amp1 + amp2))$$

$$Weight(mode2) = 1 - Weight(PLANAR) - Weight(mode1)$$

Here, mode1 and mode2 represent the prediction mode 1 and the prediction mode 2 respectively, and amp1 and amp2 represent the gradient amplitude value of the prediction mode 1 and the gradient amplitude value of the prediction mode 2 respectively. The DIMD prediction mode needs to transmit a flag bit to the decoder, and the flag bit is indicates whether the current CU uses the DIDM prediction mode.

(2) Matrix Based Intra Prediction (MIP) Mode

Processes involved in the MIP mode may be divided into three main operations, which are a down-sampling process, a matrix multiplication process, and an up-sampling process respectively. Specifically, spatially adjacent reconstruction samples are down-sampled firstly through the down-sampling process, and then a sample sequence obtained by down-sampling is used as an input vector of the matrix multiplication process, that is, an output vector of the down-sampling process is used as the input vector of the matrix multiplication process, which is then multiplied with a preset matrix and added to a bias vector, and a sample vector after calculation is output; finally, an output vector of the matrix multiplication process is used as an input vector of the up-sampling process, and a final prediction block is obtained by up-sampling.

Figure 4:
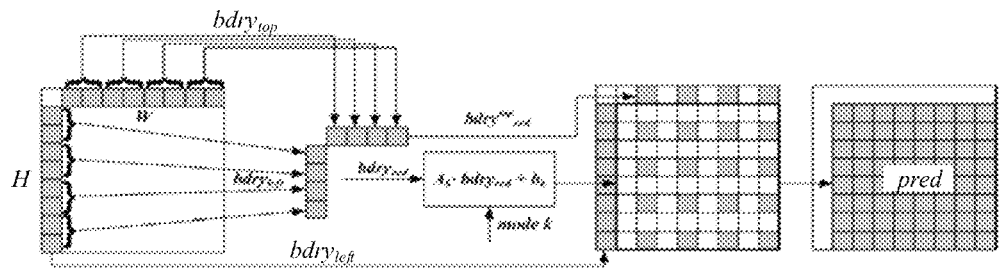
FIG. 4 is a schematic diagram of an MIP mode provided in an embodiment of the disclosure.

FIG. 4 is a schematic diagram of an MIP mode provided in an embodiment of the disclosure.

As illustrated in FIG. 4, in the down-sampling process, the MIP mode obtains an upper adjacent down-sampled reconstruction sample vector after averaging adjacent reconstruction samples above the current CU, and obtains a left adjacent down-sampled reconstruction sample vector after averaging left adjacent reconstruction samples. The upper vector and the left vector are used as input vectors of the matrix multiplication process, $A_k$ is a preset matrix, $b_k$ is a preset bias vector, and k is an index of the MIP mode. The up-sampling process performs linear interpolation and up-sampling on a result obtained by the matrix multiplication process, to obtain a prediction sample block conforming to an actual sample number of the CU.

It should be noted that the number of MIP modes may be different for CUs with different block sizes. Taking H.266/VVC as an example, with regard to a 4×4 size of CU, the MIP mode has 16 prediction modes; with regard to a 8×8 of CU with a width equal to 4 or a height equal to 4, the MIP mode has 8 prediction modes; with regard to other sizes of CUs, the MIP mode has 6 prediction modes. Furthermore, the MIP mode has a transposition function. With regard to a prediction mode conforming to a current size, the MIP mode may try transposition calculation at the encoder side. Therefore, the MIP mode not only needs a flag bit to indicate whether the current CU uses the MIP mode, but also needs to transmit an extra transposition flag bit to the decoder, if the current CU uses the MIP mode.

(3) Template Based Intra Mode Derivation (TIMD) Prediction Mode

A technical principle of the TIMD prediction mode is similar to that of the above DIMD prediction mode, and both prediction modes use a manner of same operations of the encoder and the decoder to derive the prediction mode, in order to save transmission mode index overhead. Taking ECM2.0 as an example, the TIMD prediction mode in ECM2.0 may be understood as two main parts. First, cost information of each prediction mode is calculated according to the template, and prediction modes corresponding to a minimum cost and a second minimum cost will be selected. The prediction mode corresponding to the minimum cost is recorded as a prediction mode 1, and the prediction mode corresponding to the second minimum cost is recorded as a prediction mode 2; if a ratio of a value (costMode2) of the second minimum cost to a value (costMode1) of the minimum cost meets a preset condition, such as costMode2<2*costMode1, prediction blocks corresponding to the prediction mode 1 and the prediction mode 2 respectively may be weighted and fused according to weights corresponding to the prediction mode 1 and the prediction mode 2 respectively, and then a final prediction block is obtained.

Exemplarily, the weights corresponding to the prediction mode 1 and the prediction mode 2 respectively are determined in the following manner.

$$weight1 = costMode2/(costMode1 + costMode2)$$

$$weight2 = 1 - weight1$$

Here, weight1 is a weighted weight of the prediction block corresponding to the prediction mode 1, and weight2 is a weighted weight of the prediction block corresponding to the prediction mode 2. However, if the ratio of the value costMode2 of the second minimum cost to the value costMode1 of the minimum cost does not meet the preset condition, weighted fusion between prediction blocks is not performed, and the prediction block corresponding to the prediction mode 1 is the prediction block of TIMD.

It should be noted that when the TIMD prediction mode is used to perform intra prediction on the current block, if a reconstruction sample template of the current block does not contain available adjacent reconstruction samples, the TIMD prediction mode selects the planar mode to perform intra prediction on the current block, that is, unweighted fusion is not performed. What same as the DIMD prediction mode is that the TIMD prediction mode needs to transmit a flag bit to the decoder, to indicate whether the current CU uses the TIMD prediction mode.

Figure 5:
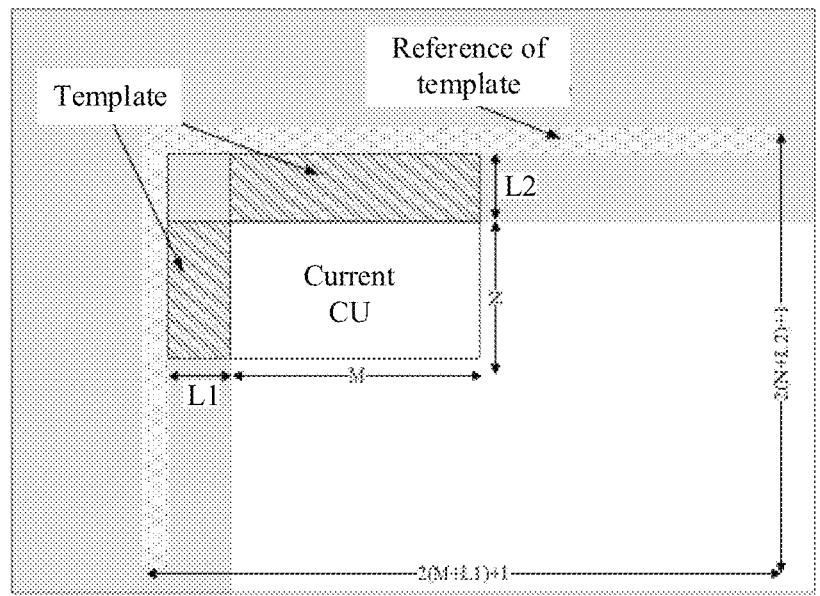
FIG. 5 is a schematic diagram of a template used by Template based Intra Mode Derivation (TIMD) provided in an embodiment of the disclosure.

FIG. 5 is a schematic diagram of a template used by TIMD provided in an embodiment of the disclosure.

As illustrated in FIG. 5, if the current block is a CU with a width equal to M and a height equal to N, the encoder and the decoder may select a reference of template of the current block based on a CU with a width equal to 2(M+L1)+1 and a height equal to 2(N+L2)+1, to calculate the reconstruction sample template of the current block. At this time, if the reconstruction sample template of the current block does not contain available adjacent reconstruction samples, the TIMD prediction mode selects the planar mode to perform intra prediction on the current block. For example, the available adjacent reconstruction samples may be samples adjacent to the left side and the upper side of the current CU in FIG. 5. That is, available reconstruction samples are not present in an area filled with oblique lines. That is, if available reconstruction samples are not present in the area filled with oblique lines, the TIMD prediction mode selects the planar mode to perform intra prediction on the current block.

Through the above brief introductions to several intra prediction modes, it is not difficult to find that the technical principle of the DIMD prediction mode is similar to that of the TIMD prediction mode, and both of which use the decoder to perform the same operations as those of the encoder, to infer the prediction model of the current CU. These prediction modes may omit transmission of the index of the prediction mode in case that complexity thereof is acceptable, to achieve an overhead saving effect and improve compression efficiency. However, due to limitation of information available for reference and a fact that there are not many parts which improve prediction quality in themselves, the DIMD prediction mode and the TIMD prediction mode have better effects in regions with a large area of consistent texture characteristics. If the texture changes slightly or area of the template cannot be covered, prediction effects of these prediction modes are poor.

Furthermore, no matter in the DIMD prediction mode or the TIMD prediction mode, prediction blocks obtained based on multiple traditional prediction modes are fused, or the prediction blocks obtained based on multiple traditional prediction modes are weighted. Fusion of the prediction blocks may generate effects which cannot be achieved by a single prediction mode. The DIMD prediction mode introduces the planar mode as an extra weighted prediction mode to increase spatial correlation between adjacent reconstruction samples and the prediction sample, and thus improve the prediction effect of intra prediction. However, since a prediction principle of the planar mode is relatively simple, using the planar mode as an extra weighted prediction mode may induce adverse effects with regard to some prediction blocks with a significant difference between an upper right corner and a lower left corner.

Furthermore, with regard to the MIP model, the MIP model is generated by simplifying the neural network, and its prediction matrix is obtained based on training. Therefore, the MIP model has a strong generalization ability and a prediction effect which cannot be achieved by the traditional prediction mode. However, as described above, the MIP mode not only needs to transmit a usage flag bit to the decoder side, but also needs to transmit an index of the mode to the decoder side, which increases bit overhead and thus reduces prediction efficiency of the intra prediction mode. Furthermore, if the MIP mode does not have the foregoing multiple prediction modes for the encoder to select therefrom, limitation of its usage in prediction is very large. The MIP mode is a model obtained by multiple simplification of hardware and software complexity for a neural network based intra prediction model. Based on a large number of training samples, multiple prediction modes represent multiple models and parameters, which may better cover texture conditions of natural sequences. If a number of prediction modes is directly reduced, advantages of the MIP mode may be reduced.

It may be clearly seen from the above analysis that the DIMD prediction mode and the TIMD prediction mode are able to omit transmission of the index of the prediction mode, to achieve an overhead saving effect, however, improvement of compression performance is limited. Furthermore, although MIP may improve the prediction effect, extra bits lead to high overhead and reduce its compression efficiency. Based on this, the disclosure integrates the MIP mode into the DIMD prediction mode or the TIMD prediction mode. On one hand, derivation functions of the DIMD prediction mode and the TIMD prediction mode are used to acquire the traditional prediction mode of the current CU and obtain a corresponding prediction block, and the index of the traditional prediction mode may not be written into the bitstream, which achieves an overhead saving effect and improves decompression efficiency. On the other hand, since the MIP mode has a strong generalization ability and a prediction effect and compression performance which cannot be achieved by the traditional prediction mode, the MIP mode is used to compensate prediction effects of the DIMD prediction mode and the TIMD prediction mode, which may ensure prediction effect. On the other hand, even though the MIP mode has a few types of modes, the DIMD prediction mode and the TIMD prediction mode may be used to reduce impact on the prediction effect due to limitation of the MIP mode, which further ensures the prediction effect and compression performance.

Figure 6:
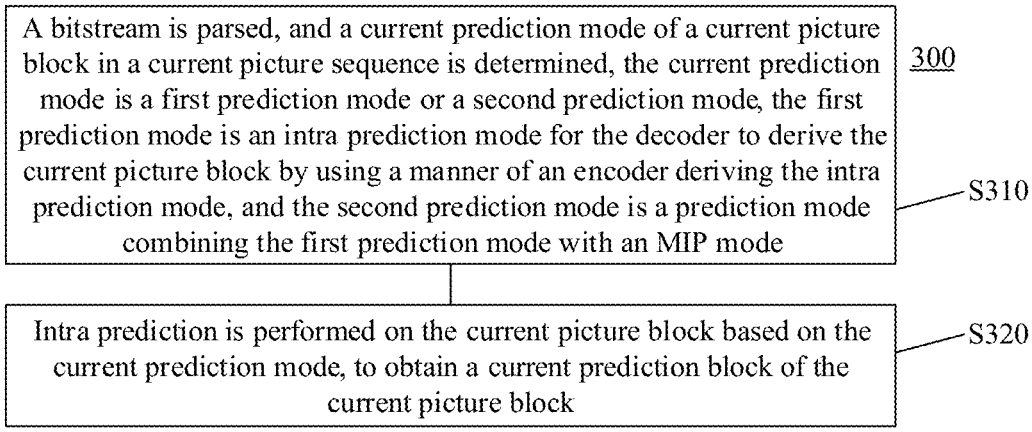
FIG. 6 is a schematic flowchart of a decoding method provided in an embodiment of the disclosure.

FIG. 6 is a schematic flowchart of an intra prediction method 300 provided in an embodiment of the disclosure. It should be understood that the decoding method 300 may be performed by a decoder. For example, the decoding method 300 is applied to the decoding framework 200 illustrated in FIG. 2. In order to facilitate descriptions, descriptions are made below by taking a decoder as an example.

As illustrated in FIG. 6, the intra prediction method 300 may include part or all of the following operations.

At S310, a bitstream is parsed, and a target prediction mode of a current picture block in a current picture sequence is determined, the target prediction mode is a first prediction mode or a second prediction mode, the first prediction mode is an intra prediction mode for the decoder to derive the current picture block by using a manner of an encoder deriving the intra prediction mode, and the second prediction mode is a prediction mode combining the first prediction mode with an MIP mode.

At S320, intra prediction is performed on the current picture block based on the target prediction mode, to obtain a target prediction block of the current picture block.

In the disclosure, the first prediction mode is designed as an intra prediction mode for the decoder to derive the current picture block by using a manner of the encoder deriving the intra prediction mode, which is equivalent to that a traditional prediction mode for predicting the current picture block may be derived by the first prediction mode, or, an index of the traditional prediction mode may not be written in the bitstream, which improves decompression efficiency of the decoder.

Furthermore, in the disclosure, the second prediction mode is designed as a prediction mode combining the first prediction mode with the MIP mode, that is, the first prediction mode is fused with the MIP mode, which is equivalent to that the traditional prediction mode of the current picture block or even the MIP mode of the current picture block may be obtained through derivation function of the first prediction mode, that is, an index of the MIP mode and the index of the traditional prediction mode may not be written into the bitstream, which improves decompression efficiency of the decoder. Furthermore, since the MIP mode has a strong generalization ability and a prediction effect which cannot be achieved by the traditional prediction mode, the MIP mode may be used to compensate a prediction effect of the first prediction mode, which can ensure decompression performance and prediction effect of the second prediction mode. Furthermore, even though the MIP mode has a few types of modes, the first prediction mode may be used to reduce impact on the prediction effect due to limitation of the MIP mode, which further ensures the decompression performance and prediction effect of the second prediction mode.

Based on this, after introducing the first prediction mode without combining with the MIP mode and the second prediction mode combined with the MIP mode, it is beneficial for the decoder to select a prediction mode with a better prediction effect from the first prediction mode and the second prediction mode, to perform intra prediction on the current picture block, which can ensure that the prediction effect and decompression performance of the decoder are improved based on improving the decompression efficiency of the encoder.

Advantageous effects which may be achieved by the solution provided in the disclosure will be described below with reference to Table 1.

TABLE 1

|  | Y (BD-rate) | U (BD-rate) | V (BD-rate) | Improvement of encoding performance (EncT) | Improvement of decoding performance (DecT) |
| --- | --- | --- | --- | --- | --- |
| Class A1 | −0.09% | 0.16% | −0.06% | 109% | 102% |
| Class A2 | −0.07% | −0.02% | −0.02% | 109% | 106% |
| Class B | −0.07% | 0.05% | −0.03% | 110% | 104% |
| Class C | −0.07% | −0.02% | 0.01% | 108% | 103% |
| Class E | −0.07% | −0.07% | 0.27% | 111% | 105% |
| average value | −0.07% | 0.02% | 0.03% | 109% | 104% |
| Class D | −0.07% | −0.03% | 0.12% | 109% | 105% |
| Class F | −0.09% | −0.07% | −0.16% | 106% | 105% |

As illustrated in Table 1, it may be seen from test results that the solution provided in the disclosure achieves performance improvement for all sequence classes of Artificial Intelligence (AI), with the most significant improvement for 4K sequence (i.e., Class F), where an average bitrate saving of 0.09% is achieved. A negative value of the Björntegaard delta bit rate (BD-rate) represents performance improvement based on the solution provided in the disclosure relative to test results of ECM2.0. It is worth noting that the TIMD prediction model integrated in ECM2.0 has higher complexity based on ECM1.0, while only achieves a performance gain of 0.4%. The disclosure can bring a good performance gain without increasing complexity of the decoder, especially for 4K sequence. Furthermore, due to server loads, even though encoding and decoding time fluctuates slightly, the decoding time does not substantially increase theoretically.

It should be noted that the second prediction mode involved in the disclosure is intended to be a prediction mode after fusion of the MIP mode and the first prediction mode. Specific implementation of the fusion is not limited in the disclosure. For example, the MIP mode may be additionally added based on the first prediction mode, or the MIP mode may be used to replace or substitute the traditional prediction mode involved in the first prediction mode. For another example, the MIP mode may be fused at a certain stage in the first prediction mode, or the MIP mode may be fused in case that certain conditions are met, which is not specifically limited in the disclosure.

In some embodiments, S310 may include the following operations.

The bitstream is parsed to acquire a first identifier, the first identifier is indicates whether the first prediction mode or the second prediction mode is allowed to be used to perform intra prediction on picture blocks in the current picture sequence.

When the first identifier indicates that the first prediction mode or the second prediction mode is allowed to be used to perform intra prediction on the picture blocks in the current picture sequence, the bitstream is parsed to acquire a second identifier, the second identifier indicates whether the first prediction mode or the second prediction mode is used to perform intra prediction on the current picture block.

When the second identifier indicates that the first prediction mode or the second prediction mode is used to perform intra prediction on the current picture block, the bitstream is parsed to acquire a third identifier, the third identifier indicates an index of the first prediction mode or an index of the second prediction mode.

When the third identifier indicates the index of the first prediction mode, the first prediction mode is determined as the target prediction mode, and when the third identifier indicates the index of the second prediction mode, the second prediction mode is determined as the target prediction mode.

In other words, if the first identifier is true, the bitstream is parsed to acquire the second identifier; if the second identifier is true, the bitstream is parsed to acquire the third identifier; if the third identifier is true, the first prediction mode is determined as the target prediction mode, and if the third identifier is false, the second prediction mode is determined as the target prediction mode. That is, in other alternative embodiments, function of the third identifier may also be replaced to indicate whether the first prediction mode is used, that is, if the third identifier indicates that the first prediction mode is not used, the second prediction mode is determined as the target prediction mode.

It should be noted that in the disclosure, the first identifier is a sequence-level identifier, each of the second identifier and the third identifier is a picture block-level identifier, and the decoder needs to determine the target prediction mode in combination with the first identifier, the second identifier and the third identifier. Of course, in other alternative embodiments, only the second identifier and the third identifier may be included, or even the second identifier and the third identifier may be merged into an identifier, and this identifier indicates whether the first prediction mode is used to perform intra prediction on the current picture block. For example, if this identifier indicates that the first prediction mode is used to perform intra prediction on the current picture block, the first prediction mode is determined as the target prediction mode, and if this identifier indicates that the first prediction mode is not used to perform intra prediction on the current picture block, the second prediction mode is determined as the target prediction mode. Furthermore, the first identifier may also be referred to as a usage-allowable identifier, the second identifier may also be referred to as a usage identifier, and the third identifier may also be referred to as an index identifier, that is, names of various identifiers are not limited in the disclosure.

Of course, in other alternative embodiments, the bitstream may further include other identifiers or reference information, which is not specifically limited in the disclosure. For example, the bitstream may also be parsed to acquire a fourth identifier, and the fourth identifier indicates an index of the MIP mode. For another example, the bitstream may also be parsed to acquire a fifth identifier, and the fifth identifier indicates that the MIP mode uses a pre-transposed prediction matrix or a post-transposed prediction matrix.

In some embodiments, the first prediction mode is a DIMD prediction mode.

A gradient amplitude value corresponding to each of at least one prediction mode is calculated in a reconstruction sample area adjacent to the current picture block; a prediction mode having a maximum gradient amplitude value of the at least one prediction mode is used as a third prediction mode, and a prediction mode having a maximum gradient amplitude value of the at least one prediction mode other than the third prediction mode is used as a fourth prediction mode.

Intra prediction is performed on the current picture block based on the third prediction mode and the fourth prediction mode, to obtain the target prediction block.

In other words, if the first prediction mode is the DIMD prediction mode, the decoder may perform intra prediction on the current picture block based on the third prediction mode and the fourth prediction mode, to obtain the target prediction block.

In an implementation, the target prediction mode is the first prediction mode.

When neither the third prediction mode nor the fourth prediction mode includes a planar mode and a DC mode, and a gradient amplitude value of the fourth prediction mode is greater than 0, weighted average process is performed on a first prediction block, a second prediction block and a third prediction block to obtain the target prediction block; the first prediction block is a prediction block obtained by performing intra prediction on the current picture block based on the third prediction mode, the second prediction block is a prediction block obtained by performing intra prediction on the current picture block based on the fourth prediction mode, and the third prediction block is a prediction block obtained by performing intra prediction on the current picture block based on the planar mode.

When the third prediction mode and the fourth prediction mode include the planar mode or the DC mode, or the gradient amplitude value of the fourth prediction mode is less than or equal to 0, the first prediction block is determined as the target prediction block.

In other words, in case that the first prediction mode is the DIMD prediction mode and the target prediction mode is the first prediction mode, if neither the third prediction mode nor the fourth prediction mode includes the planar mode and the DC mode, and the gradient amplitude value of the fourth prediction mode is greater than 0, the target prediction block is obtained by performing weighted average process on the first prediction block, the second prediction block and the third prediction block; if the third prediction mode and the fourth prediction mode include the planar mode or the DC mode, or the gradient amplitude value of the fourth prediction mode is less than or equal to 0, the first prediction block is determined as the target prediction block.

Optionally, the third prediction block has a preset weight.

Before performing weighted average process on the first prediction block, the second prediction block and the third prediction block, the method 300 may further include the following operations.

A product of a first weight and a first coefficient is determined as a weight of the first prediction block; the first weight is a difference between 1 and the weight of the third prediction block, the first coefficient is a ratio of a gradient amplitude value of the third prediction mode to a first gradient amplitude value, and the first gradient amplitude value is a sum of the gradient amplitude value of the third prediction mode and the gradient amplitude value of the fourth prediction mode.

A product of the first weight and a second coefficient is determined as a weight of the second prediction block; the second coefficient is equal to a ratio of the gradient amplitude value of the fourth prediction mode to the first gradient amplitude value.

Exemplarily, if the current picture block uses the first prediction mode, the intra prediction mode is derived by using the same method as that of the encoder. Specifically, a Sobel operator is used in a preset adjacent reconstruction sample area to calculate a gradient amplitude value corresponding to each prediction mode. A prediction mode with a maximum gradient amplitude value is recorded as a prediction mode 1, and a prediction mode with a second maximum gradient amplitude value is recorded as a prediction mode 2. If neither the prediction mode 1 nor the prediction mode 2 is the planar mode or the DC mode, and an amplitude value of the prediction mode 2 is greater than 0, then weighted average between prediction blocks is performed. First, a weight of the prediction block 1 corresponding to the planar mode is fixed and set to ⅓, and then a weight of the prediction mode 1 and a weight of the prediction mode 2 are obtained according to a ratio of the gradient amplitude value of the prediction mode 1 to the gradient amplitude value of the prediction mode 2. For example, the weight of the prediction mode 1 is a value obtained by dividing the gradient amplitude value of the prediction mode 1 by a sum of the gradient amplitude value of the prediction mode 1 and the gradient amplitude value of the prediction mode 2 and then multiplying by ⅔, and the weight of the prediction mode 2 is a value obtained by dividing the gradient amplitude value of the prediction mode 2 by the sum of the gradient amplitude value of the prediction mode 1 and the gradient amplitude value of the prediction mode 2 and then multiplying by ⅔. The prediction block 1, a prediction block 2 obtained based on the prediction mode 2, and a corresponding prediction block 3 based on the prediction mode 2 are weighted to be used as the target prediction block. If the planar mode or the DC mode is present in the prediction mode 1 and the prediction mode 2, or the amplitude value of the prediction mode 2 is less than or equal to 0, weighted average between prediction blocks is not performed, the prediction mode 1 may be used as an optimal prediction mode, and the prediction block 1 corresponding thereto may be used as the target prediction block.

Of course, the weight of the third prediction block being ⅓ is only an example of the disclosure, and should not be construed as limitation to the disclosure. Even in other alternative embodiments, the weight of the first prediction block and the weight of the second prediction block may also be preset, or the weight of the first prediction block and the weight of the second prediction block may be determined based on other information, which is not limited in the disclosure.

In another implementation, the target prediction mode is the second prediction mode.

When neither the third prediction mode nor the fourth prediction mode includes a planar mode and a DC mode, and a gradient amplitude value of the fourth prediction mode is greater than 0, the target prediction block is obtained by performing weighted average process on a first prediction block, a second prediction block and a fourth prediction block; the first prediction block is a prediction block obtained by performing intra prediction on the current picture block based on the third prediction mode, the second prediction block is a prediction block obtained by performing intra prediction on the current picture block based on the fourth prediction mode, and the fourth prediction block is a prediction block obtained by performing intra prediction on the current picture block based on the MIP mode.

When the third prediction mode and the fourth prediction mode include the planar mode or the DC mode, or the gradient amplitude value of the fourth prediction mode is less than or equal to 0, the first prediction block is determined as the target prediction block.

In other words, in case that the first prediction mode is the DIMD prediction mode and the target prediction mode is the second prediction mode, if neither the third prediction mode nor the fourth prediction mode includes the planar mode and the DC mode, and the gradient amplitude value of the fourth prediction mode is greater than 0, then the target prediction block is obtained by performing weighted average process on the first prediction block, the second prediction block and the fourth prediction block; if the third prediction mode and the fourth prediction mode include the planar mode or the DC mode, or the gradient amplitude value of the fourth prediction mode is less than or equal to 0, then the first prediction block is determined as the target prediction block.

Of course, the above fusion manner of MIP and the first prediction mode is only an example of the disclosure, and should not be construed as limitation to the disclosure.

For example, in other alternative embodiments, intra prediction may also be performed on the current picture block based on the MIP mode and the third prediction mode only, to obtain the target prediction block. Specifically, if the third prediction mode is neither the planar mode or the DC mode, the target prediction block is obtained by performing weighted average process on the first prediction block and the fourth prediction block; if the third prediction mode is the planar mode or the DC mode, the first prediction block is determined as the target prediction block.

In some embodiments, the fourth prediction block has a preset weight.

Before performing weighted average process on the first prediction block, the second prediction block and the fourth prediction block, the method 300 may further include the following operations.

A product of a second weight and a first coefficient is determined as a weight of the first prediction block; the second weight is a difference between 1 and the weight of the fourth prediction block, the first coefficient is a ratio of a gradient amplitude value of the third prediction mode to a first gradient amplitude value, and the first gradient amplitude value is a sum of the gradient amplitude value of the third prediction mode and the gradient amplitude value of the fourth prediction mode.

A product of the second weight and a second coefficient is determined as a weight of the second prediction block; the second coefficient is equal to a ratio of the gradient amplitude value of the fourth prediction mode to the first gradient amplitude value.

Exemplarily, if the current picture block uses the second prediction mode, the intra prediction mode is derived by using the same method as that of the encoder. Specifically, a Sobel operator is used in a preset adjacent reconstruction sample area to calculate a gradient amplitude value corresponding to each prediction mode. A prediction mode with a maximum gradient amplitude value is recorded as a prediction mode 1, and a prediction mode with a second maximum gradient amplitude value is recorded as a prediction mode 2. If neither the prediction mode 1 nor the prediction mode 2 is the planar mode or the DC mode, and an amplitude value of the prediction mode 2 is greater than 0, then weighted average between prediction blocks is performed. First, a weight of an MIP mode with an index of 0 is fixed and set to $\tfrac{1}{3}$, and then a weight of the prediction mode 1 and a weight of the prediction mode 2 are obtained according to a ratio of amplitude values corresponding to the prediction mode 1 and the prediction mode 2. For example, the weight of the prediction mode 1 is a value obtained by dividing a gradient amplitude value of the prediction mode 1 by a sum of the gradient amplitude value of the prediction mode 1 and a gradient amplitude value of the prediction mode 2 and then multiplying by $\tfrac{4}{5}$, and the weight of the prediction mode 2 is a value obtained by dividing the gradient amplitude value of the prediction mode 2 by the sum of the gradient amplitude value of the prediction mode 1 and the gradient amplitude value of the prediction mode 2 and then multiplying by $\tfrac{4}{5}$. The prediction block 1, a prediction block 2 obtained based on the prediction mode 2, and a corresponding prediction block 3 based on the prediction mode 2 are weighted to be used as the target prediction block. If the planar mode or the DC mode is present in the prediction mode 1 and the prediction mode 2, or the amplitude value of the prediction mode 2 is less than or equal to 0, then weighted average between prediction blocks is not performed, the prediction mode 1 may be used as an optimal prediction mode, and the prediction block 1 corresponding thereto may be used as the target prediction block.

Of course, the weight of the third prediction block being $\tfrac{1}{5}$ is only an example of the disclosure, and should not be construed as limitation to the disclosure. Even in other alternative embodiments, the weight of the first prediction block and the weight of the second prediction block may also be preset, or the weight of the first prediction block and the weight of the second prediction block may be determined based on other information, which is not limited in the disclosure.

In some embodiments, the first prediction mode is a TIMD prediction mode.

When a reconstruction sample template of the current picture block includes reconstruction samples adjacent to the current picture block, a rate distortion cost of each of at least one prediction mode is calculated; a prediction mode having a minimum rate distortion cost of the at least one prediction mode is used as a fifth prediction mode.

Intra prediction is performed on the current picture block based on the fifth prediction mode, to obtain the target prediction block.

In some embodiments, the target prediction mode is the first prediction mode.

In other words, if the first prediction mode is the TIMD prediction mode, the decoder may perform intra prediction on the current picture block based on the fifth prediction mode, to obtain the target prediction block.

When a rate distortion cost of the fifth prediction mode and a rate distortion cost of a sixth prediction mode meet a preset ratio, weighted average process is performed on a fifth prediction block and a sixth prediction block to obtain the target prediction block; a prediction mode having a minimum rate distortion cost of the at least one prediction mode other than the fifth prediction mode is used as the sixth prediction mode, the fifth prediction block is a prediction block obtained by performing intra prediction on the current picture block based on the fifth prediction mode, and the sixth prediction block is a prediction block obtained by performing intra prediction on the current picture block based on the sixth prediction mode.

When the rate distortion cost of the fifth prediction mode and the rate distortion cost of the sixth prediction mode do not meet the preset ratio, the fifth prediction block is determined as the target prediction block.

In other words, in case that the first prediction mode is the TIMD prediction mode and the target prediction mode is the first prediction mode, if the rate distortion cost of the fifth prediction mode and the rate distortion cost of the sixth prediction mode meet the preset ratio, the target prediction block is obtained by performing weighted average process on the fifth prediction block and the sixth prediction block; if the rate distortion cost of the fifth prediction mode and the rate distortion cost of the sixth prediction mode do not meet the preset ratio, the fifth prediction block may be directly determined as the target prediction block.

In some embodiments, the method 300 may further include the following operations.

When the reconstruction sample template of the current picture block does not include reconstruction samples adjacent to the current picture block, a prediction block obtained by performing intra prediction on the current picture block based on a planar mode is determined as the target prediction block.

In other words, in case that the first prediction mode is the TIMD prediction mode and the target prediction mode is the first prediction mode, if the reconstruction sample template of the current picture block does not include reconstruction samples adjacent to the current picture block, the prediction block obtained by performing intra prediction on the current picture block based on the planar mode is determined as the target prediction block.

In some embodiments, before performing weighted average process on the fifth prediction block and the sixth prediction block, the method 300 may further include the following operations.

A product of a third weight and a third coefficient is determined as a weight of the fifth prediction block; the third weight is a ratio of the rate distortion cost of the fifth prediction mode to a first rate distortion cost, and the first rate distortion cost is a sum of the rate distortion cost of the fifth prediction mode and the rate distortion cost of the sixth prediction mode.

A difference between 1 and the third weight is determined as a weight of the sixth prediction block.

Exemplarily, if the current picture block uses the first prediction mode, the intra prediction mode is derived by using the same method as that of the encoder. Specifically, a Sum of Absolute Transformed Difference (SATD) method is used in a preset reconstruction sample template to calculate cost corresponding to each prediction mode in a mode list; a prediction mode with a minimum cost is recorded as a prediction mode 1, and a prediction mode with a second minimum cost is recorded as a prediction mode 2. If cost values corresponding to the prediction mode 1 and the prediction mode 2 meet a certain ratio, weighted average between prediction blocks is performed. For example, a corresponding weight may be obtained according to the ratio of cost values corresponding to the prediction mode 1 and the prediction mode 2, and a weighted prediction block is used as the target prediction block. If the cost values corresponding to the prediction mode 1 and the prediction mode 2 cannot meet a certain ratio, then weighted average between prediction blocks is not performed, the prediction mode 1 is used as an optimal prediction mode, and the prediction block corresponding thereto is used as the target prediction block. If reconstruction samples are not present in the reconstruction sample template, the prediction mode 1 is set as the planar mode, and the prediction block obtained based on the prediction mode 1 is used as the target prediction block.

In some embodiments, the target prediction mode is the second prediction mode.

Weighted average process is performed on a fifth prediction block and a seventh prediction block to obtain the target prediction block; the fifth prediction block is a prediction block obtained by performing intra prediction on the current picture block based on the fifth prediction mode, and the seventh prediction block is a prediction block obtained by performing intra prediction on the current picture block based on the MIP mode.

In other words, in case that the first prediction mode is the TIMD prediction mode and the target prediction mode is the second prediction mode, the target prediction block is obtained by performing weighted average process on the fifth prediction block and the seventh prediction block.

In some embodiments, each of the fifth prediction block and the seventh prediction block has a preset weight.

Exemplarily, if the current picture block uses the second prediction mode, the intra prediction mode is derived by using the same method as that of the encoder. Specifically, an SATD method is used in a preset reconstruction sample template to calculate cost corresponding to each prediction mode in a mode list; a prediction mode with a minimum cost is recorded as a prediction mode 1. A prediction mode 2 is set as an MIP mode with an index of 0. At this time, a prediction block obtained by a weighted average of the prediction block corresponding to the prediction mode 1 and the prediction block corresponding to the prediction mode 2 in a ratio of 1:1, may be used as the target prediction block.

Of course, each of the weight of the fifth prediction block and the weight of the seventh prediction block being ½ is only an example of the disclosure, and should not be construed as limitation to the disclosure. For example, in other alternative embodiments, a corresponding weight may also be obtained based on the ratio of cost values corresponding to the prediction mode 1 and the prediction mode 2, and a weighted prediction block is used as the target prediction block; or, the weight of the fifth prediction block and the weight of the seventh prediction block may be determined based on other information, which is not limited in the disclosure.

In some embodiments, an index of the MIP mode is preset.

Of course, in other alternative embodiments, the decoder may also parse the bitstream to acquire a fourth identifier, the fourth identifier indicates the index of the MIP mode; for another example, the decoder may also parse the bitstream to acquire a fifth identifier, the fifth identifier indicates that the MIP mode uses a pre-transposed prediction matrix or a post-transposed prediction matrix.

It should be noted that the solution provided in the disclosure may be used in a specific size of picture block.

For example, whether the second prediction mode is introduced may be individually controlled according to the size of the current picture block. For example, when the size of the picture block is greater than 32×32, the second prediction mode is introduced, that is, when the size of the picture block is greater than 32×32, the target prediction mode determined from the first prediction mode and the second prediction mode is used to perform intra prediction on the current picture block; in other words, if the size of the picture block is less than or equal to 32×32, the second prediction mode is not introduced, only the second identifier indicating usage of the DIMD prediction mode or the TIMD prediction mode needs to be written into the bitstream, the third identifier mentioned above does not need to be written into the bitstream, and the first prediction mode is used by default to perform intra prediction on the current picture block.

For another example, whether the second prediction mode is introduced may be individually controlled according to a picture type of a picture where the current picture block is located. For example, when the picture type of the picture where the current picture block is located is an I picture, the second prediction mode is not introduced, that is, if the picture type of the picture where the current picture block is located is an I picture, only the second identifier indicating usage of the DIMD prediction mode or the TIMD prediction mode needs to be written into the bitstream, the third identifier mentioned above does not need to be written into the bitstream, and the first prediction mode is used by default to perform intra prediction on the current picture block.

For another example, whether the second prediction mode is introduced may be controlled in combination with the size of the current picture block and the picture type. For example, when the size of the picture block is greater than a 32×32 CU and the picture where the current picture block is located is an I picture, the second prediction mode is not introduced, only the second identifier indicating usage of the DIMD prediction mode or the TIMD prediction mode needs to be written into the bitstream, the third identifier mentioned above does not need to be written into the bitstream, and the first prediction mode is used by default to perform intra prediction on the current picture block.

The decoding method according to the embodiment of the disclosure has been described in detail as above from the perspective of the decoder, and an encoding method according to an embodiment of the disclosure will be described below from the perspective of an encoder with reference to FIG. 7.

Figure 7:
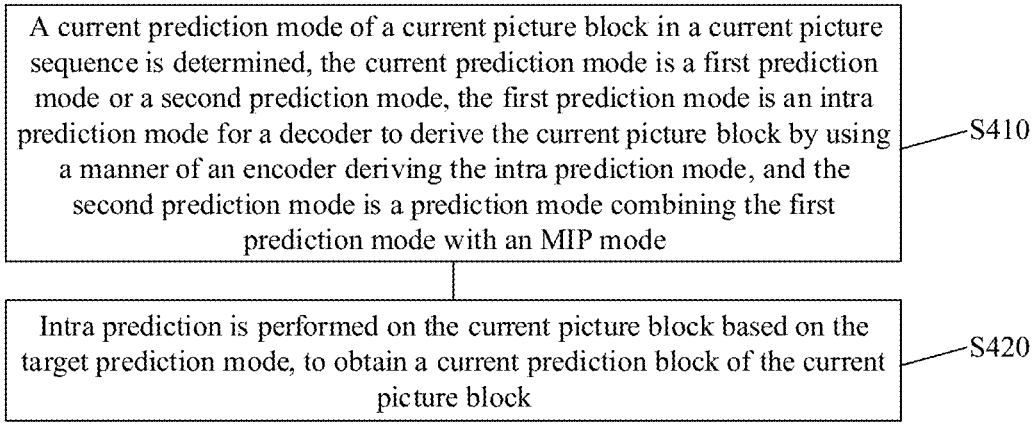
FIG. 7 is a schematic flowchart of an encoding method provided in an embodiment of the disclosure.

FIG. 7 is a schematic flowchart of an encoding method 400 provided in an embodiment of the disclosure. It should be understood that the encoding method 400 may be performed by an encoder. For example, the encoding method 400 is applied to the encoding framework 100 illustrated in FIG. 1. In order to facilitate descriptions, descriptions are made below by taking an encoder as an example.

At S410, a target prediction mode of a current picture block in a current picture sequence is determined, the target prediction mode is a first prediction mode or a second prediction mode, the first prediction mode is an intra prediction mode for a decoder to derive the current picture block by using a manner of the encoder deriving the intra prediction mode, and the second prediction mode is a prediction mode combining the first prediction mode with an MIP mode.

At S420, intra prediction is performed on the current picture block based on the target prediction mode, to obtain a target prediction block of the current picture block.

In the disclosure, the first prediction mode is designed as an intra prediction mode for the decoder to derive the current picture block by using a manner of the encoder deriving the intra prediction mode, which is equivalent to that a traditional prediction mode for predicting the current picture block may be derived by the first prediction mode, or, an index of the traditional prediction mode may not be written into the bitstream, which improves compression efficiency of the encoder.

Furthermore, in the disclosure, the second prediction mode is designed as a prediction mode combining the first prediction mode with the MIP mode, that is, the first prediction mode is fused with the MIP mode, which is equivalent to that the traditional prediction mode of the current picture block or even the MIP mode of the current picture block may be obtained through derivation function of the first prediction mode, that is, an index of the MIP mode and the index of the traditional prediction mode may not be written in the bitstream, which improves compression efficiency of the encoder. Furthermore, since the MIP mode has a strong generalization ability and a prediction effect which cannot be achieved by the traditional prediction mode, the MIP mode may be used to compensate a prediction effect of the first prediction mode, which can ensure decompression performance and prediction effect of the second prediction mode. Furthermore, even though the MIP mode has a few types of modes, the first prediction mode may be used to reduce impact on the prediction effect due to limitation of the MIP mode, which further ensures the decompression performance and prediction effect of the second prediction mode.

Based on this, after introducing the first prediction mode without combining with the MIP mode and the second prediction mode combined with the MIP mode, it is beneficial for the encoder to select a prediction mode with a better prediction effect from the first prediction mode and the second prediction mode, to perform intra prediction on the current picture block, which can ensure that the prediction effect and decompression performance of the decoder are improved based on improving the compression efficiency of the encoder.

In some embodiments, S410 may include the following operations.

A first identifier is acquired; the first identifier indicating whether the first prediction mode or the second prediction mode is allowed to be used to perform intra prediction on picture blocks in the current picture sequence.

When the first identifier indicates that the first prediction mode or the second prediction mode is allowed to be used to perform intra prediction on the picture blocks in the current picture sequence, a rate distortion cost of the first prediction mode and a rate distortion cost of the second prediction mode are determined.

A prediction mode having a minimum rate distortion cost of the first prediction mode and the second prediction mode is determined as the target prediction mode.

It should be noted that manners of the encoder acquiring the first identifier are not specifically limited in the disclosure. For example, in an implementation, whether the first identifier is enabled in a sequence parameter set (seq_parameter_set_rbsp) may be controlled by way of user's setting. In case that the first identifier is enabled in the sequence parameter set, the encoder may acquire a specific value of the first identifier by querying a profile configured by the user, that is, the specific value indicates whether the identifier is 1 or 0.

In some embodiments, the method 400 may further include the following operations.

The current picture sequence is encoded based on the target prediction block, the first identifier, a second identifier and a third identifier, to obtain a bitstream of the current picture sequence; the second identifier indicates whether the first prediction mode or the second prediction mode is used to perform intra prediction on the current picture block, and the third identifier indicates an index of the first prediction mode or an index of the second prediction mode.

In some embodiments, the first prediction mode is a DIMD prediction mode.

A gradient amplitude value corresponding to each of at least one prediction mode is calculated in a reconstruction sample area adjacent to the current picture block; a prediction mode having a maximum gradient amplitude value of the at least one prediction mode is used as a third prediction mode, and a prediction mode having a maximum gradient amplitude value of the at least one prediction mode other than the third prediction mode is used as a fourth prediction mode.

The rate distortion cost of the first prediction mode and the rate distortion cost of the second prediction mode are determined based on the third prediction mode and the fourth prediction mode.

In some embodiments, when neither the third prediction mode nor the fourth prediction mode includes a planar mode and a DC mode, and a gradient amplitude value of the fourth prediction mode is greater than 0, weighted average process is performed on a first prediction block, a second prediction block and a third prediction block to obtain the target prediction block; the first prediction block is a prediction block obtained by performing intra prediction on the current picture block based on the third prediction mode, the second prediction block is a prediction block obtained by performing intra prediction on the current picture block based on the fourth prediction mode, and the third prediction block is a prediction block obtained by performing intra prediction on the current picture block based on the planar mode.

When the third prediction mode and the fourth prediction mode include the planar mode or the DC mode, or the gradient amplitude value of the fourth prediction mode is less than or equal to 0, the first prediction block is determined as the target prediction block. A rate distortion cost of the target prediction block is determined as the rate distortion cost of the first prediction mode.

In some embodiments, the third prediction block has a preset weight.

Before performing weighted average process on the first prediction block, the second prediction block and the third prediction block, the method 400 may further include the following operations.

A product of a first weight and a first coefficient is determined as a weight of the first prediction block; the first weight is a difference between 1 and the weight of the third prediction block, the first coefficient is a ratio of a gradient amplitude value of the third prediction mode to a first gradient amplitude value, and the first gradient amplitude value is a sum of the gradient amplitude value of the third prediction mode and the gradient amplitude value of the fourth prediction mode.

A product of the first weight and a second coefficient is determined as a weight of the second prediction block; the second coefficient is equal to a ratio of the gradient amplitude value of the fourth prediction mode to the first gradient amplitude value.

In some embodiments, if neither the third prediction mode nor the fourth prediction mode includes a planar mode and a DC mode, and a gradient amplitude value of the fourth prediction mode is greater than 0, then the target prediction block is obtained by performing weighted average process on a first prediction block, a second prediction block and a fourth prediction block; the first prediction block is a prediction block obtained by performing intra prediction on the current picture block based on the third prediction mode, the second prediction block is a prediction block obtained by performing intra prediction on the current picture block based on the fourth prediction mode, and the fourth prediction block is a prediction block obtained by performing intra prediction on the current picture block based on the MIP mode.

If the third prediction mode and the fourth prediction mode include the planar mode or the DC mode, or the gradient amplitude value of the fourth prediction mode is less than or equal to 0, then the first prediction block is determined as the target prediction block.

A rate distortion cost of the target prediction block is determined as the rate distortion cost of the second prediction mode.

In some embodiments, the fourth prediction block has a preset weight.

Before performing weighted average process on the first prediction block, the second prediction block and the fourth prediction block, the method 400 may further include the following operations.

A product of a second weight and a first coefficient is determined as a weight of the first prediction block; the second weight is a difference between 1 and the weight of the fourth prediction block, the first coefficient is a ratio of a gradient amplitude value of the third prediction mode to a first gradient amplitude value, and the first gradient amplitude value is a sum of the gradient amplitude value of the third prediction mode and the gradient amplitude value of the fourth prediction mode.

A product of the second weight and a second coefficient is determined as a weight of the second prediction block; the second coefficient is equal to a ratio of the gradient amplitude value of the fourth prediction mode to the first gradient amplitude value.

In some embodiments, the first prediction mode is a TIMD prediction mode.

When a reconstruction sample template of the current picture block includes reconstruction samples adjacent to the current picture block, a rate distortion cost of each of at least one prediction mode is calculated; a prediction mode having a minimum rate distortion cost of the at least one prediction mode is used as a fifth prediction mode.

The rate distortion cost of the first prediction mode and the rate distortion cost of the second prediction mode are determined based on the fifth prediction mode.

In some embodiments, when a rate distortion cost of the fifth prediction mode and a rate distortion cost of a sixth prediction mode meet a preset ratio, weighted average process is performed on a fifth prediction block and a sixth prediction block to obtain the target prediction block; a prediction mode having a minimum rate distortion cost of the at least one prediction mode other than the fifth prediction mode is used as the sixth prediction mode, the fifth prediction block is a prediction block obtained by performing intra prediction on the current picture block based on the fifth prediction mode, and the sixth prediction block is a prediction block obtained by performing intra prediction on the current picture block based on the sixth prediction mode.

When the rate distortion cost of the fifth prediction mode and the rate distortion cost of the sixth prediction mode do not meet the preset ratio, the fifth prediction block is determined as the target prediction block.

A rate distortion cost of the target prediction block is determined as the rate distortion cost of the first prediction mode.

In some embodiments, the method 400 may further include the following operations.

When the reconstruction sample template of the current picture block does not include reconstruction samples adjacent to the current picture block, a prediction block obtained by performing intra prediction on the current picture block based on a planar mode, is determined as the target prediction block.

The rate distortion cost of the first prediction mode is determined as the rate distortion cost of the target prediction block.

In some embodiments, before performing weighted average process on the fifth prediction block and the sixth prediction block, the method 400 may further include the following operations.

A product of a third weight and a third coefficient is determined as a weight of the fifth prediction block; the third weight is a ratio of the rate distortion cost of the fifth prediction mode to a first rate distortion cost, and the first rate distortion cost is a sum of the rate distortion cost of the fifth prediction mode and the rate distortion cost of the sixth prediction mode.

A difference between 1 and the third weight is determined as a weight of the sixth prediction block.

In some embodiments, weighted average process is performed on a fifth prediction block and a seventh prediction block to obtain the target prediction block; the fifth prediction block is a prediction block obtained by performing intra prediction on the current picture block based on the fifth prediction mode, and the seventh prediction block is a prediction block obtained by performing intra prediction on the current picture block based on the MIP mode.

A rate distortion cost of the target prediction block is determined as the rate distortion cost of the second prediction mode.

In some embodiments, each of the fifth prediction block and the seventh prediction block has a preset weight.

In some embodiments, the MIP mode has a preset index.

It should be understood that processes of the encoding method 400 are inverse processes of the decoding method 300, that is, operations of the encoding method 400 may refer to corresponding operations of the decoding method 300, which are not elaborated here for the sake of brevity.

The solutions of the disclosure will be described below with reference to specific embodiments.

First Embodiment

In this embodiment, the first prediction mode is a DIMD prediction mode, and the second prediction mode is a DIMD prediction mode combined with an MIP mode. That is, the encoder or the decoder may perform intra prediction on the current picture block based on the target prediction mode in the DIMD prediction mode and the DIMD prediction mode combined with the MIP mode.

The encoding method of the encoder and the decoding method of the decoder will be described below respectively.
(1) Encoding Method The encoder traverses prediction modes, and if the current picture block is in an intra mode, the encoder acquires a first identifier, the first identifier is a sequence-level identifier and indicates that the encoder is allowed to use the first prediction mode or the second prediction mode at present. Exemplarily, the first identifier may be expressed as sps_DIMD_enable_flag.

If the first identifier is true, the encoder obtains cost of the target prediction block obtained based on the first prediction mode and cost of the target prediction block obtained based on the second prediction mode, by trying the first prediction mode and the second prediction mode in the following manner.

In a process of trying the first prediction mode, the encoder may use a Sobel operator in a preset adjacent reconstruction sample area to calculate a gradient amplitude value corresponding to each prediction mode. A prediction mode with a maximum gradient amplitude value is recorded as a prediction mode 1, and a prediction mode with a second maximum gradient amplitude value is recorded as a prediction mode 2. If neither the prediction mode 1 nor the prediction mode 2 is the planar mode or the DC mode, and an amplitude value of the prediction mode 2 is greater than 0, then weighted average between prediction blocks is performed. First, a weight of the prediction block 1 corresponding to the planar mode is fixed and set to ⅓, and then a weight of the prediction mode 1 and a weight of the prediction mode 2 are obtained according to a ratio of a gradient amplitude value of the prediction mode 1 to a gradient amplitude value of the prediction mode 2. For example, the weight of the prediction mode 1 is a value obtained by dividing the gradient amplitude value of the prediction mode 1 by a sum of the gradient amplitude value of the prediction mode 1 and the gradient amplitude value of the prediction mode 2 and then multiplying by ⅔, and the weight of the prediction mode 2 is a value obtained by dividing the gradient amplitude value of the prediction mode 2 by the sum of the gradient amplitude value of the prediction mode 1 and the gradient amplitude value of the prediction mode 2 and then multiplying by ⅔. The prediction block 1, a prediction block 2 obtained based on the prediction mode 2, and a corresponding prediction block 3 based on the prediction mode 2 are weighted to be used as the target prediction block. If the planar mode or the DC mode is present in the prediction mode 1 and the prediction mode 2, or the amplitude value of the prediction mode 2 is less than or equal to 0, then weighted average between prediction blocks is not performed, the prediction mode 1 may be used as an optimal prediction mode, and the prediction block 1 corresponding thereto may be used as the target prediction block. The encoder records the cost of the target prediction block obtained based on the first prediction mode as c1.

In a process of trying the second prediction mode, the encoder may use a Sobel operator in a preset adjacent reconstruction sample area, to calculate a gradient amplitude value corresponding to each prediction mode. A prediction mode with a maximum gradient amplitude value is recorded as a prediction mode 1, and a prediction mode with a second maximum gradient amplitude value is recorded as a prediction mode 2. If neither the prediction mode 1 nor the prediction mode 2 is the planar mode or the DC mode, and an amplitude value of the prediction mode 2 is greater than 0, weighted average between prediction blocks is performed. First, a weight of an MIP mode with an index of 0 is fixed and set to ⅖, and then a weight of the prediction mode 1 and a weight of the prediction mode 2 are obtained according to a ratio of amplitude values corresponding to the prediction mode 1 and the prediction mode 2. For example, the weight of the prediction mode 1 is a value obtained by dividing a gradient amplitude value of the prediction mode 1 by a sum of the gradient amplitude value of the prediction mode 1 and a gradient amplitude value of the prediction mode 2 and then multiplying by ⅘, and the weight of the prediction mode 2 is a value obtained by dividing the gradient amplitude value of the prediction mode 2 by the sum of the gradient amplitude value of the prediction mode 1 and the gradient amplitude value of the prediction mode 2 and then multiplying by ⅘. The prediction block 1, a prediction block 2 obtained based on the prediction mode 2, and a corresponding prediction block 3 based on the prediction mode 2 are weighted to be used as the target prediction block. If the planar mode or the DC mode is present in the prediction mode 1 and the prediction mode 2, or the amplitude value of the prediction mode 2 is less than or equal to 0, then weighted average between prediction blocks is not performed, the prediction mode 1 may be used as an optimal prediction mode, and the prediction block 1 corresponding thereto may be used as the target prediction block. The encoder records the cost of the target prediction block obtained based on the second prediction mode as c2.

The encoder continues to traverse other intra prediction technologies, calculates corresponding rate distortion costs, and records the costs as c3, . . . , cN.

If c1 or c2 is a minimum rate distortion cost among all rate distortion costs, the current picture block uses the first prediction mode or the second prediction mode; at this time, the encoder may set the second identifier to be true and write it into the bitstream, the second identifier indicates whether the first prediction mode or the second prediction mode is used to perform intra prediction on the current picture block. Furthermore, the encoder also needs to write a third identifier into the bitstream, the third identifier indicates an index of the first prediction mode or an index of the second prediction mode. Specifically, if c1 is minimum, then the index of the first prediction mode is written into the bitstream; if c2 is minimum, the index of the second prediction mode is written into the bitstream. For example, if c1 is minimum, the third identifier is set to be true and written into the bitstream; if c2 is minimum, the third identifier is set to be false and written into the bitstream.

If neither c1 nor c2 is the minimum rate distortion cost among all rate distortion costs, the current picture block uses other intra prediction technologies, and the first identifier is set to be false and written into the bitstream, to indicate that the current picture block does not use the first prediction mode or the second prediction mode to perform intra prediction. Furthermore, it may also write the information such as identifiers and/or indexes of other intra prediction technologies into the bitstream, which are not described in detail here.

After obtaining the target prediction block, the encoder may obtain the residual block of the current picture block based on the target prediction block, and perform transform and quantization, entropy coding, in-loop filtering or other specific processes on the residual block of the current picture block. Specific processes may refer to descriptions of the encoding framework illustrated in FIG. 1, which are not elaborated here to avoid repetition.

(2) Decoding Method

If the current picture block is in an intra mode, the decoder acquires a first identifier by parsing the bitstream, the first identifier is a sequence-level identifier and indicates that the encoder is allowed to use the first prediction mode or the second prediction mode at present. Exemplarily, the first identifier may be expressed as sps_DIMD_enable_flag.

If the first identifier is true, the bitstream is parsed to acquire a second identifier, and the second identifier indicates whether the first prediction mode or the second prediction mode is used to perform intra prediction on the current picture block. If the second identifier is true, the following operation 1.1 is performed; otherwise, the following operation 2 is performed.

Operation 1.1

If the second identifier is true, the decoder continues to acquire a third identifier by parsing the bitstream, the third identifier indicates an index of the first prediction mode or an index of the second prediction mode. If the third identifier indicates the index of the first prediction mode, the following operation 1.2 is performed and operation 2 is skipped; if the third identifier indicates the index of the second prediction mode, the following operation 1.3 is performed and operation 2 is skipped.

Operation 1.2

The decoder derives the intra prediction mode by using the same method as that of the encoder. Specifically, the decoder uses a Sobel operator in a preset adjacent reconstruction sample area to calculate a gradient amplitude value corresponding to each prediction mode. A prediction mode with a maximum gradient amplitude value is recorded as a prediction mode 1, and a prediction mode with a second maximum gradient amplitude value is recorded as a prediction mode 2. If neither the prediction mode 1 nor the prediction mode 2 is the planar mode or the DC mode, and an amplitude value of the prediction mode 2 is greater than 0, then weighted average between prediction blocks is performed. First, a weight of the prediction block 1 corresponding to the planar mode is fixed and set to ⅓, and then a weight of the prediction mode 1 and a weight of the prediction mode 2 are obtained according to a ratio of a gradient amplitude value of the prediction mode 1 to a gradient amplitude value of the prediction mode 2. For example, the weight of the prediction mode 1 is a value obtained by dividing the gradient amplitude value of the prediction mode 1 by a sum of the gradient amplitude value of the prediction mode 1 and the gradient amplitude value of the prediction mode 2 and then multiplying by ⅔, and the weight of the prediction mode 2 is a value obtained by dividing the gradient amplitude value of the prediction mode 2 by the sum of the gradient amplitude value of the prediction mode 1 and the gradient amplitude value of the prediction mode 2 and then multiplying by ⅔. The prediction block 1, a prediction block 2 obtained based on the prediction mode 2, and a corresponding prediction block 3 based on the prediction mode 2 are weighted to be used as the target prediction block. If the planar mode or the DC mode is present in the prediction mode 1 and the prediction mode 2, or the amplitude value of the prediction mode 2 is less than or equal to 0, weighted average between prediction blocks is not performed, the prediction mode 1 may be used as an optimal prediction mode, and the prediction block 1 corresponding thereto may be used as the target prediction block.

Operation 1.3

The decoder derives the intra prediction mode is derived by using the same method as that of the encoder. Specifically, the decoder uses a Sobel operator in a preset adjacent reconstruction sample area to calculate a gradient amplitude value corresponding to each prediction mode. A prediction mode with a maximum gradient amplitude value is recorded as a prediction mode 1, and a prediction mode with a second maximum gradient amplitude value is recorded as a prediction mode 2. If neither the prediction mode 1 nor the prediction mode 2 is the planar mode or the DC mode, and an amplitude value of the prediction mode 2 is greater than 0, then weighted average between prediction blocks is performed. First, a weight of an MIP mode with an index of 0 is fixed and set to ⅗, and then a weight of the prediction mode 1 and a weight of the prediction mode 2 are obtained according to a ratio of amplitude values corresponding to the prediction mode 1 and the prediction mode 2. For example, the weight of the prediction mode 1 is a value obtained by dividing a gradient amplitude value of the prediction mode 1 by a sum of the gradient amplitude value of the prediction mode 1 and a gradient amplitude value of the prediction mode 2 and then multiplying by ⅘, and the weight of the prediction mode 2 is a value obtained by dividing the gradient amplitude value of the prediction mode 2 by the sum of the gradient amplitude value of the prediction mode 1 and the gradient amplitude value of the prediction mode 2 and then multiplying by ⅘. The prediction block 1, a prediction block 2 obtained based on the prediction mode 2, and a corresponding prediction block 3 based on the prediction mode 2 are weighted to be used as the target prediction block. If the planar mode or the DC mode is present in the prediction mode 1 and the prediction mode 2, or the amplitude value of the prediction mode 2 is less than or equal to 0, weighted average between prediction blocks is not performed, the prediction mode 1 may be used as an optimal prediction mode, and the prediction block 1 corresponding thereto may be used as the target prediction block.

Operation 2

The decoder continues to parse usage identifiers and/or indexes of other intra prediction technologies or other information, and performs intra prediction on the current picture block according to the parsed information, to obtain the target prediction block.

After obtaining the target prediction block, the decoder may obtain the residual block of the current picture block by parsing the bitstream, and perform inverse quantization and inverse transform on the residual block of the current picture block, to obtain time domain residual information, and then superimpose the target prediction block onto the time domain residual information to obtain a reconstruction sample block; all reconstruction sample blocks are subjected to in-loop filtering or other technologies, to obtain a final reconstruction picture, which may be used as a video to be output, or may be used as a reference for subsequent decoding.

It should be noted that in this embodiment, weights involved in the first prediction mode or the second prediction mode may be determined or defined in other manners, which is not specifically limited in the disclosure. In other words, weights involved in this embodiment may be preset weights, or may be weights calculated according to other information. Furthermore, in this embodiment, fusion of the MIP mode with an index of 0 and the first prediction mode is only an example of the second prediction mode. In other alternative embodiments, it may also perform fusion of MIP modes with indexes of other values and the first prediction mode, which is not specifically limited in the disclosure.

Second Embodiment

In this embodiment, the first prediction mode is a TIMD prediction mode, and the second prediction mode is a TIMD prediction mode combined with an MIP mode. That is, the encoder or the decoder may perform intra prediction on the current picture block based on the target prediction mode in the TIMD prediction mode and the TIMD prediction mode combined with the MIP mode.

The encoding method of the encoder and the decoding method of the decoder will be described below respectively.

(1) Encoding Method

The encoder traverses prediction modes, and if the current picture block is in an intra mode, the encoder acquires a first identifier, the first identifier is a sequence-level identifier and indicates that the encoder is allowed to use the first prediction mode or the second prediction mode at present. Exemplarily, the first identifier may be expressed as sps_TIMD_enable_flag.

If the first identifier is true, the encoder obtains cost of the target prediction block obtained based on the first prediction mode and cost of the target prediction block obtained based on the second prediction mode, by trying the first prediction mode and the second prediction mode in the following manner.

In a process of trying the first prediction mode, the encoder may use an SATD method in a preset reconstruction sample template to calculate cost corresponding to each prediction mode in a mode list; a prediction mode with a minimum cost is recorded as a prediction mode 1, and a prediction mode with a second minimum cost is recorded as a prediction mode 2. If cost values corresponding to the prediction mode 1 and the prediction mode 2 meet a certain ratio, then weighted average between prediction blocks is performed. For example, a corresponding weight may be obtained according to the ratio of cost values corresponding to the prediction mode 1 and the prediction mode 2, and a weighted prediction block is used as the target prediction block. If the cost values corresponding to the prediction mode 1 and the prediction mode 2 cannot meet a certain ratio, then weighted average between prediction blocks is not performed, the prediction mode 1 is used as an optimal prediction mode, and the prediction block corresponding thereto is used as the target prediction block. If reconstruction samples are not present in the reconstruction sample template, then the prediction mode 1 is set as the planar mode, and the prediction block obtained based on the prediction mode 1 is used as the target prediction block. The encoder records the cost of the target prediction block obtained based on the first prediction mode as c1.

In a process of trying the second prediction mode, the encoder may use an SATD method in a preset reconstruction sample template to calculate cost corresponding to each prediction mode in a mode list; a prediction mode with a minimum cost is recorded as a prediction mode 1. A prediction mode 2 is set as an MIP mode with an index of 0. At this time, a prediction block obtained by a weighted average of the prediction block corresponding to the prediction mode 1 and the prediction block corresponding to the prediction mode 2 in a ratio of 1:1 may be used as the target prediction block. The encoder records the cost of the target prediction block obtained based on the second prediction mode as c2.

The encoder continues to traverse other intra prediction technologies, calculates corresponding rate distortion costs, and records the costs as c3, . . . , cN.

If c1 or c2 is a minimum rate distortion cost among all rate distortion costs, the current picture block uses the first prediction mode or the second prediction mode; at this time, the encoder may set the second identifier to be true and write it into the bitstream, the second identifier indicates whether the first prediction mode or the second prediction mode is used to perform intra prediction on the current picture block. Furthermore, the encoder also needs to write a third identifier into the bitstream, the third identifier indicates an index of the first prediction mode or an index of the second prediction mode. Specifically, if c1 is minimum, then the index of the first prediction mode is written into the bitstream; if c2 is minimum, the index of the second prediction mode is written into the bitstream. For example, if c1 is minimum, the third identifier is set to be true and written into the bitstream; if c2 is minimum, the third identifier is set to be false and written into the bitstream.

If neither c1 nor c2 is the minimum rate distortion cost among all rate distortion costs, the current picture block uses other intra prediction technologies, and the first identifier is set to be false and written into the bitstream, to indicate that the current picture block does not use the first prediction mode or the second prediction mode to perform intra prediction. Furthermore, it may also write the information such as identifiers and/or indexes of other intra prediction technologies are written into the bitstream, which are not described in detail here.

After obtaining the target prediction block, the encoder may obtain the residual block of the current picture block based on the target prediction block, and perform transform and quantization, entropy coding, in-loop filtering or other specific processes on the residual block of the current picture block. Specific processes may refer to descriptions of the encoding framework illustrated in FIG. 1, which are not elaborated here to avoid repetition.

(2) Decoding Method

If the current picture block is in an intra mode, the decoder acquires a first identifier by parsing the bitstream, the first identifier is a sequence-level identifier and indicates that the encoder is allowed to use the first prediction mode or the second prediction mode at present. Exemplarily, the first identifier may be expressed as sps_TIMD_enable_flag.

If the first identifier is true, the bitstream is parsed to acquire a second identifier, and the second identifier indicates whether the first prediction mode or the second prediction mode is used to perform intra prediction on the current picture block. If the second identifier is true, the following operation 1.1 is performed; otherwise, the following operation 2 is performed.

Operation 1.1

If the second identifier is true, the decoder continues to acquire a third identifier by parsing the bitstream, the third identifier indicates an index of the first prediction mode or an index of the second prediction mode. If the third identifier indicates the index of the first prediction mode, the following operation 1.2 is performed and operation 2 is skipped; if the third identifier indicates the index of the second prediction mode, the following operation 1.3 is performed and operation 2 is skipped.

Operation 1.2

The decoder derives the intra prediction mode by using the same method as that of the encoder. Specifically, the decoder uses an SATD method in a preset reconstruction sample template to calculate cost corresponding to each prediction mode in a mode list; a prediction mode with a minimum cost is recorded as a prediction mode 1, and a prediction mode with a second minimum cost is recorded as a prediction mode 2. If cost values corresponding to the prediction mode 1 and the prediction mode 2 meet a certain ratio, then weighted average between prediction blocks is performed. For example, a corresponding weight may be obtained according to the ratio of cost values corresponding to the prediction mode 1 and the prediction mode 2, and a weighted prediction block is used as the target prediction block. If the cost values corresponding to the prediction mode 1 and the prediction mode 2 cannot meet a certain ratio, then weighted average between prediction blocks is not performed, the prediction mode 1 is used as an optimal prediction mode, and the prediction block corresponding thereto is used as the target prediction block. If reconstruction samples are not present in the reconstruction sample template, the prediction mode 1 is set as the planar mode, and the prediction block obtained based on the prediction mode 1 is used as the target prediction block.

Operation 1.3

The decoder derives the intra prediction mode by using the same method as that of the encoder. Specifically, the decoder uses an SATD method in a preset reconstruction sample template, to calculate cost corresponding to each prediction mode in a mode list; a prediction mode with a minimum cost is recorded as a prediction mode 1. A prediction mode 2 is set as an MIP mode with an index of 0. At this time, a prediction block obtained by a weighted average of the prediction block corresponding to the prediction mode 1 and the prediction block corresponding to the prediction mode 2 in a ratio of 1:1 may be used as the target prediction block.

Operation 2

The decoder continues to parse usage identifiers and/or indexes of other intra prediction technologies or other information, and performs intra prediction on the current picture block according to the parsed information, to obtain the target prediction block.

After obtaining the target prediction block, the decoder may obtain the residual block of the current picture block by parsing the bitstream, and perform inverse quantization and inverse transform on the residual block of the current picture block, to obtain time domain residual information, and then superimpose the target prediction block onto the time domain residual information to obtain a reconstruction sample block; all reconstruction sample blocks are subjected to in-loop filtering or other technologies, to obtain a final reconstruction picture, which may be used as a video to be output, or may be used as a reference for subsequent decoding.

It should be noted that in this embodiment, weights involved in the first prediction mode or the second prediction mode may be determined or defined in other manners, which is not specifically limited in the disclosure. In other words, weights involved in this embodiment may be preset weights, or may be weights calculated according to other information. Furthermore, in this embodiment, fusion of the MIP mode with an index of 0 and the first prediction mode is only an example of the second prediction mode. In other alternative embodiments, it may also perform fusion of MIP modes with indexes of other values and the first prediction mode, which is not specifically limited in the disclosure.

Preferred implementations of the disclosure have been described in detail as above with reference to the drawings. However, the disclosure is not limited to specific details of the above implementations. Within the scope of the technical concept of the disclosure, various simple modifications may be made to the technical solutions of the disclosure, and all these simple modifications belong to the scope of protection of the disclosure. For example, various specific technical features described in the above specific implementations may be combined in any suitable manner without conflict. In order to avoid unnecessary repetition, various possible combination manners will not be described in the disclosure any more. For another example, various different implementations of the disclosure may also be arbitrarily combined there-between, as long as they do not depart from the idea of the disclosure, and they should also be considered as contents disclosed in the disclosure. It should also be understood that in various method embodiments of the disclosure, sizes of serial numbers of the above processes do not mean their orders of execution. The execution order of each process should be determined by its function and internal logic, and should not constitute any limitation to implementation of the embodiments of the disclosure.

The method embodiments of the disclosure are described in detail as above, and apparatus embodiments of the disclosure are described in detail below with reference to FIG. 8 to FIG. 10.

Figure 8:
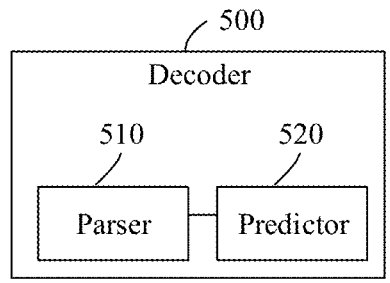
FIG. 8 is a schematic block diagram of a decoder provided in an embodiment of the disclosure.

FIG. 8 is a schematic block diagram of a decoder 500 according to an embodiment of the disclosure.

As illustrated in FIG. 8, the decoder 500 may include a parser 510 and a predictor (prediction unit) 520.

The parser 510 is configured to parse a bitstream, and determine a target prediction mode of a current picture block in a current picture sequence, the target prediction mode is a first prediction mode or a second prediction mode, the first prediction mode is an intra prediction mode for the decoder to derive the current picture block by using a manner of an encoder deriving the intra prediction mode, and the second prediction mode is a prediction mode combining the first prediction mode with an MIP mode.

The predictor 520 is configured to perform intra prediction on the current picture block based on the target prediction mode, to obtain a target prediction block of the current picture block.

In some embodiments, the parser 510 is specifically configured to perform the following operations.

The bitstream is parsed to acquire a first identifier, the first identifier indicates whether the first prediction mode or the second prediction mode is allowed to be used to perform intra prediction on picture blocks in the current picture sequence.

When the first identifier indicates that the first prediction mode or the second prediction mode is allowed to be used to perform intra prediction on the picture blocks in the current picture sequence, the bitstream is parsed to acquire a second identifier, the second identifier indicates whether the first prediction mode or the second prediction mode is used to perform intra prediction on the current picture block.

When the second identifier indicates that the first prediction mode or the second prediction mode is used to perform intra prediction on the current picture block, the bitstream is parsed to acquire a third identifier, the third identifier indicates an index of the first prediction mode or an index of the second prediction mode.

When the third identifier indicates the index of the first prediction mode, the first prediction mode is determined as the target prediction mode, and if the third identifier indicates the index of the second prediction mode, the second prediction mode is determined as the target prediction mode.

In some embodiments, the first prediction mode is a DIMD prediction mode.

The predictor 520 is specifically configured to perform the following operations.

A gradient amplitude value corresponding to each of at least one prediction mode in a reconstruction sample area adjacent to the current picture block is calculated, here a prediction mode having a maximum gradient amplitude value of the at least one prediction mode is used as a third prediction mode, and a prediction mode having a maximum gradient amplitude value of the at least one prediction mode rather than is used as a fourth prediction mode.

Intra prediction is performed on the current picture block based on the third prediction mode and the fourth prediction mode, to obtain the target prediction block.

In some embodiments, the target prediction mode is the first prediction mode.

The predictor 520 is specifically configured to perform the following operations.

When neither the third prediction mode or the fourth prediction mode includes a planar mode and a DC mode, and a gradient amplitude value of the fourth prediction mode is greater than 0, weighted average process is performed on a first prediction block, a second prediction block and a third prediction block to obtain the target prediction block, here the first prediction block is a prediction block obtained by performing intra prediction on the current picture block based on the third prediction mode, the second prediction block is a prediction block obtained by performing intra prediction on the current picture block based on the fourth prediction mode, and the third prediction block is a prediction block obtained by performing intra prediction on the current picture block based on the planar mode.

When the third prediction mode and the fourth prediction mode include the planar mode or the DC mode, or the gradient amplitude value of the fourth prediction mode is less than or equal to 0, the first prediction block is determined as the target prediction block.

In some embodiments, the third prediction block has a preset weight.

Before performing weighted average process on the first prediction block, the second prediction block and the third prediction block, the predictor 520 is further configured to perform the following operations.

A product of a first weight and a first coefficient is determined as a weight of the first prediction block, here the first weight is a difference between 1 and the weight of the third prediction block, the first coefficient is a ratio of a gradient amplitude value of the third prediction mode to a first gradient amplitude value, and the first gradient amplitude value is a sum of the gradient amplitude value of the third prediction mode and the gradient amplitude value of the fourth prediction mode.

A product of the first weight and a second coefficient is determined as a weight of the second prediction block, here the second coefficient is equal to a ratio of the gradient amplitude value of the fourth prediction mode to the first gradient amplitude value.

In some embodiments, the target prediction mode is the second prediction mode.

The predictor 520 is specifically configured to perform the following operations.

When neither the third prediction mode nor the fourth prediction mode includes a planar mode and a DC mode, and a gradient amplitude value of the fourth prediction mode is greater than 0, weighted average process is performed on a first prediction block, a second prediction block and a fourth prediction block to obtain the target prediction block, here the first prediction block is a prediction block obtained by performing intra prediction on the current picture block based on the third prediction mode, the second prediction block is a prediction block obtained by performing intra prediction on the current picture block based on the fourth prediction mode, and the fourth prediction block is a prediction block obtained by performing intra prediction on the current picture block based on the MIP mode.

When the third prediction mode and the fourth prediction mode include the planar mode or the DC mode, or the gradient amplitude value of the fourth prediction mode is less than or equal to 0, the first prediction block is determined as the target prediction block.

In some embodiments, the fourth prediction block has a preset weight.

Before performing weighted average process on the first prediction block, the second prediction block and the fourth prediction block, the predictor 520 is further configured to perform the following operations.

A product of a second weight and a first coefficient is determined as a weight of the first prediction block, here the second weight is a difference between 1 and the weight of the fourth prediction block, the first coefficient is a ratio of a gradient amplitude value of the third prediction mode to a first gradient amplitude value, and the first gradient amplitude value is a sum of the gradient amplitude value of the third prediction mode and the gradient amplitude value of the fourth prediction mode.

A product of the second weight and a second coefficient is determined as a weight of the second prediction block, here the second coefficient is equal to a ratio of the gradient amplitude value of the fourth prediction mode to the first gradient amplitude value.

In some embodiments, the first prediction mode is a TIMD prediction mode.

The predictor 520 is specifically configured to perform the following operations.

When a reconstruction sample template of the current picture block includes reconstruction samples adjacent to the current picture block, a rate distortion cost of each of at least one prediction mode is calculated, here a prediction mode having a minimum rate distortion cost of the at least one prediction mode is used as a fifth prediction mode.

Intra prediction is performed on the current picture block based on the fifth prediction mode, to obtain the target prediction block.

In some embodiments, the target prediction mode is the first prediction mode.

The predictor 520 is specifically configured to perform the following operations.

When a rate distortion cost of the fifth prediction mode and a rate distortion cost of a sixth prediction mode meet a preset ratio, the target prediction block by performing weighted average process on a fifth prediction block and a sixth prediction block is obtained, here a prediction mode having a minimum rate distortion cost of the at least one prediction mode rather than the fifth prediction mode is used as the sixth prediction mode, the fifth prediction block is a prediction block obtained by performing intra prediction on the current picture block based on the fifth prediction mode, and the sixth prediction block is a prediction block obtained by performing intra prediction on the current picture block based on the sixth prediction mode.

When the rate distortion cost of the fifth prediction mode and the rate distortion cost of the sixth prediction mode do not meet the preset ratio, the fifth prediction block is determined as the target prediction block.

In some embodiments, the predictor 520 is further configured to perform the following operations.

When the reconstruction sample template of the current picture block does not include reconstruction samples adjacent to the current picture block, a prediction block obtained by performing intra prediction on the current picture block based on a planar mode is determine as the target prediction block.

In some embodiments, before performing weighted average process on the fifth prediction block and the sixth prediction block, the predictor 520 is further configured to perform the following operations.

A product of a third weight and a third coefficient is determined as a weight of the fifth prediction block, here the third weight is a ratio of the rate distortion cost of the fifth prediction mode to a first rate distortion cost, and the first rate distortion cost is a sum of the rate distortion cost of the fifth prediction mode and the rate distortion cost of the sixth prediction mode; and A difference between 1 and the third weight is determined as a weight of the sixth prediction block.

In some embodiments, the target prediction mode is the second prediction mode.

The predictor 520 is specifically configured to perform the following operations.

The target prediction block is obtained by performing weighted average process on a fifth prediction block and a seventh prediction block, here the fifth prediction block is a prediction block obtained by performing intra prediction on the current picture block based on the fifth prediction mode, and the seventh prediction block is a prediction block obtained by performing intra prediction on the current picture block based on the MIP mode.

In some embodiments, each of the fifth prediction block and the seventh prediction block has a preset weight.

In some embodiments, the MIP mode has a preset index.

Figure 9:
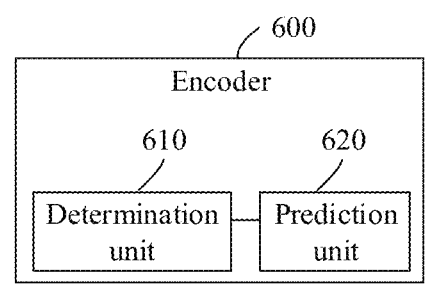
FIG. 9 is a schematic block diagram of an encoder provided in an embodiment of the disclosure.

FIG. 9 is a schematic block diagram of an encoder 600 according to an embodiment of the disclosure.

As illustrated in FIG. 9, the encoder 600 may include a determination unit 610 and a prediction unit 620.

The determination unit 610 is configured to determine a target prediction mode of a current picture block in a current picture sequence, the target prediction mode is a first prediction mode or a second prediction mode, the first prediction mode is an intra prediction mode for a decoder to derive the current picture block by using a manner of the encoder deriving the intra prediction mode, and the second prediction mode is a prediction mode combining the first prediction mode with an MIP mode.

The prediction unit 620 is configured to perform intra prediction on the current picture block based on the target prediction mode, to obtain a target prediction block of the current picture block.

In some embodiments, the determination unit 610 is specifically configured to perform the following operations.

A first identifier is acquired, here the first identifier indicates whether the first prediction mode or the second prediction mode is allowed to be used to perform intra prediction on picture blocks in the current picture sequence.

When the first identifier indicates that the first prediction mode or the second prediction mode is allowed to be used to perform intra prediction on the picture blocks in the current picture sequence, a rate distortion cost of the first prediction mode and a rate distortion cost of the second prediction mode are determined.

A prediction mode having a minimum rate distortion cost of the first prediction mode and the second prediction mode is determined as the target prediction mode.

In some embodiments, the prediction unit 620 is further configured to perform the following operations.

The current picture sequence is encoded based on the target prediction block, the first identifier, a second identifier and a third identifier, to obtain a bitstream of the current picture sequence, here the second identifier indicates whether the first prediction mode or the second prediction mode is used to perform intra prediction on the current picture block, and the third identifier indicates an index of the first prediction mode or an index of the second prediction mode.

In some embodiments, the first prediction mode is a DIMD prediction mode.

The determination unit 610 is specifically configured to perform the following operations.

A gradient amplitude value corresponding to each of at least one prediction mode in a reconstruction sample area adjacent to the current picture block is calculated, here a prediction mode having a maximum gradient amplitude value of the at least one prediction mode is used as a third prediction mode, and a prediction mode having a maximum gradient amplitude value of the at least one prediction mode rather than the third prediction mode is used as a fourth prediction mode.

The rate distortion cost of the first prediction mode and the rate distortion cost of the second prediction mode are determined based on the third prediction mode and the fourth prediction mode.

In some embodiments, the determination unit 610 is specifically configured to perform the following operations.

When neither the third prediction mode nor the fourth prediction mode includes a planar mode and a DC mode, and a gradient amplitude value of the fourth prediction mode is greater than 0, the target prediction block is obtained by performing weighted average process on a first prediction block, a second prediction block and a third prediction block, here the first prediction block is a prediction block obtained by performing intra prediction on the current picture block based on the third prediction mode, the second prediction block is a prediction block obtained by performing intra prediction on the current picture block based on the fourth prediction mode, and the third prediction block is a prediction block obtained by performing intra prediction on the current picture block based on the planar mode.

When the third prediction mode and the fourth prediction mode include the planar mode or the DC mode, or the gradient amplitude value of the fourth prediction mode is less than or equal to 0, the first prediction block is determined as the target prediction block.

A rate distortion cost of the target prediction block is determined as the rate distortion cost of the first prediction mode.

In some embodiments, the third prediction block has a preset weight.

Before performing weighted average process on the first prediction block, the second prediction block and the third prediction block, the determination unit 610 is further configured to perform the following operations.

A product of a first weight and a first coefficient is determined as a weight of the first prediction block, here the first weight is a difference between 1 and the weight of the third prediction block, the first coefficient is a ratio of a gradient amplitude value of the third prediction mode to a first gradient amplitude value, and the first gradient amplitude value is a sum of the gradient amplitude value of the third prediction mode and the gradient amplitude value of the fourth prediction mode.

A product of the first weight and a second coefficient is determined as a weight of the second prediction block, here the second coefficient is equal to a ratio of the gradient amplitude value of the fourth prediction mode to the first gradient amplitude value.

In some embodiments, the determination unit 610 is specifically configured to perform the following operations.

When neither the third prediction mode nor the fourth prediction mode includes a planar mode and a DC mode, and a gradient amplitude value of the fourth prediction mode is greater than 0, the target prediction block is obtained by performing weighted average process on a first prediction block, a second prediction block and a fourth prediction block, here the first prediction block is a prediction block obtained by performing intra prediction on the current picture block based on the third prediction mode, the second prediction block is a prediction block obtained by performing intra prediction on the current picture block based on the fourth prediction mode, and the fourth prediction block is a prediction block obtained by performing intra prediction on the current picture block based on the MIP mode.

When the third prediction mode and the fourth prediction mode include the planar mode or the DC mode, or the gradient amplitude value of the fourth prediction mode is less than or equal to 0, the first prediction block is determined as the target prediction block.

A rate distortion cost of the target prediction block is determined as the rate distortion cost of the second prediction mode.

In some embodiments, the fourth prediction block has a preset weight.

Before performing weighted average process on the first prediction block, the second prediction block and the fourth prediction block, the determination unit 610 is further configured to perform the following operations.

A product of a second weight and a first coefficient is determined as a weight of the first prediction block, here the second weight is a difference between 1 and the weight of the fourth prediction block, the first coefficient is a ratio of a gradient amplitude value of the third prediction mode to a first gradient amplitude value, and the first gradient amplitude value is a sum of the gradient amplitude value of the third prediction mode and the gradient amplitude value of the fourth prediction mode.

A product of the second weight and a second coefficient is determined as a weight of the second prediction block, here the second coefficient is equal to a ratio of the gradient amplitude value of the fourth prediction mode to the first gradient amplitude value.

In some embodiments, the first prediction mode is a TIMD prediction mode.

The determination unit 610 is specifically configured to perform the following operations.

When a reconstruction sample template of the current picture block includes reconstruction samples adjacent to the current picture block, calculate a rate distortion cost of each of at least one prediction mode, here a prediction mode, with a minimum rate distortion cost, of the at least one prediction mode is used as a fifth prediction mode.

The rate distortion cost of the first prediction mode and the rate distortion cost of the second prediction mode are determined based on the fifth prediction mode.

In some embodiments, the determination unit 610 is specifically configured to perform the following operations.

When a rate distortion cost of the fifth prediction mode and a rate distortion cost of a sixth prediction mode meet a preset ratio, the target prediction block is obtained by performing weighted average process on a fifth prediction block and a sixth prediction block, here a prediction mode having a minimum rate distortion cost of the at least one prediction mode rather than the fifth prediction mode is used as the sixth prediction mode, the fifth prediction block is a prediction block obtained by performing intra prediction on the current picture block based on the fifth prediction mode, and the sixth prediction block is a prediction block obtained by performing intra prediction on the current picture block based on the sixth prediction mode.

When the rate distortion cost of the fifth prediction mode and the rate distortion cost of the sixth prediction mode do not meet the preset ratio, the fifth prediction block is determined as the target prediction block.

The rate distortion cost of the first prediction mode is determined as a rate distortion cost of the target prediction block.

In some embodiments, the determination unit 610 is further configured to perform the following operations.

When the reconstruction sample template of the current picture block does not include reconstruction samples adjacent to the current picture block, a prediction block obtained by performing intra prediction on the current picture block based on a planar mode is determined as the target prediction block.

The rate distortion cost of the target prediction block is determined as the rate distortion cost of the first prediction mode.

In some embodiments, before performing weighted average process on the fifth prediction block and the sixth prediction block, the determination unit 610 is further configured to perform the following operations.

A product of a third weight and a third coefficient is determined as a weight of the fifth prediction block, here the third weight is a ratio of the rate distortion cost of the fifth prediction mode to a first rate distortion cost, and the first rate distortion cost is a sum of the rate distortion cost of the fifth prediction mode and the rate distortion cost of the sixth prediction mode.

A difference between 1 and the third weight is determined as a weight of the sixth prediction block.

In some embodiments, the determination unit 610 is specifically configured to perform the following operations.

The target prediction block is obtained by performing weighted average process on a fifth prediction block and a seventh prediction block, here the fifth prediction block is a prediction block obtained by performing intra prediction on the current picture block based on the fifth prediction mode, and the seventh prediction block is a prediction block obtained by performing intra prediction on the current picture block based on the MIP mode.

A rate distortion cost of the target prediction block is determined as the rate distortion cost of the second prediction mode.

In some embodiments, each of a weight of the fifth prediction block and a weight of the seventh prediction block is a preset weight.

In some embodiments, the MIP mode has a preset index.

It should be understood that the apparatus embodiments and the method embodiments may correspond to each other, similar descriptions may refer to the method embodiments, which are not elaborated here to avoid repetition. Specifically, the decoder 500 illustrated in FIG. 8 may correspond to a corresponding main body performing the method 300 according to the embodiment of the disclosure, and foregoing and other operations and/or functions of each unit in the decoder 500 are intended to implement corresponding processes in various methods such as the method 300 or the like respectively. The encoder 600 illustrated in FIG. 9 may correspond to a corresponding main body performing the method 400 according to the embodiment of the disclosure, that is, foregoing and other operations and/or functions of each unit in the encoder 600 are intended to implement corresponding processes in various methods such as the method 400 or the like respectively.

It should also be understood that various units in the decoder 500 or the encoder 600 involved in the embodiments of the disclosure may be combined into one or several other units, or a certain (some) unit may be further divided into multiple smaller functional units, which may achieve the same operation without affecting implementation of the technical effects of the embodiments of the disclosure. The above units are divided based on logical functions. In an actual application, functions of one unit may also be implemented by multiple units, or functions of multiple units may be implemented by one unit. In other embodiments of the disclosure, the decoder 500 or the encoder 600 may also include other units. In an actual application, these functions may also be implemented with assistance of other units, and may be implemented by multiple units in cooperation. According to another embodiment of the disclosure, the decoder 500 or the coder 600 involved in the embodiments of the disclosure may be configured, and the encoding method or the decoding method according to the embodiments of the disclosure may be implemented, by executing a computer program (including program codes) capable of performing operations involved in corresponding methods on a general-purpose computing device such as a general-purpose computer including processing elements and storage elements such as a Central Processing Unit (CPU), a Random Access Memory (RAM), a Read Only Memory (ROM), etc. For example, the computer program may be recorded in a computer-readable storage medium, loaded in an electronic device through the computer-readable storage medium, and executed in the electronic device, to implement corresponding methods according to the embodiments of the disclosure.

In other words, the units mentioned above may be implemented in form of hardware, or may be implemented by instructions in form of software, or may be implemented by a combination of software and hardware. Specifically, each operation of the method embodiments in the embodiments of the disclosure may be completed by an integrated logic circuit in form of hardware in a processor or instructions in form of software. Operations of the methods disclosed in combination with the embodiments of the disclosure may be directly embodied as being performed and completed by a hardware decoding processor, or performed and completed by a combination of hardware in the decoding processor and software. Optionally, the software may be located in a mature storage medium in the field such as a random memory, a flash memory, a ROM, a Programmable ROM (PROM), an electrically erasable programmable memory, a register, etc. The storage medium is located in a memory, and the processor reads information in the memory and completes operations of the above method embodiments in combination with hardware thereof.

Figure 10:
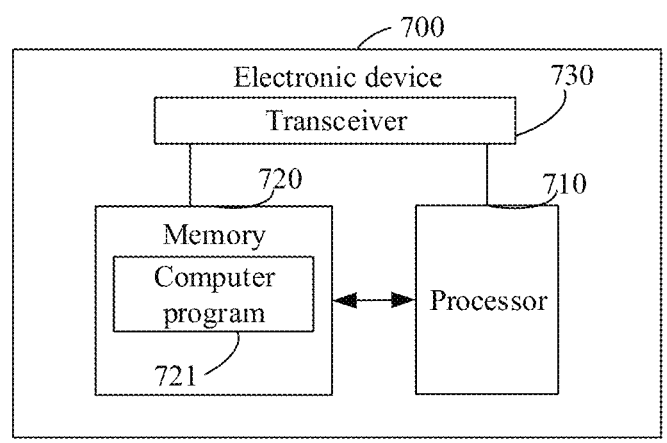
FIG. 10 is a schematic block diagram of an electronic device provided in an embodiment of the disclosure.

FIG. 10 is a schematic structural diagram of an electronic device 700 provided in an embodiment of the disclosure.

As illustrated in FIG. 10, the electronic device 700 includes at least a processor 710 and a computer-readable storage medium 720. The processor 710 and the computer-readable storage medium 720 may be connected through a bus or in other manners. The computer-readable storage medium 720 is configured to store a computer program 721, the computer program 721 includes computer instructions, and the processor 710 is configured to execute the computer instructions stored in the computer-readable storage medium 720. The processor 710 is a computing core and a control core of the electronic device 700, and is adapted to implement one or more computer instructions, and is specifically adapted to load and execute one or more computer instructions to implement corresponding method processes or corresponding functions.

As an example, the processor 710 may also be referred to as a CPU. The processor 710 may include, but is not limited to a general-purpose processor, a Digital Signal Processor (DSP), an Application Specific Integrated Circuit (ASIC), a Field Programmable Gate Array (FPGA) or other programmable logic devices, a discrete gate or a transistor logic device, a discrete hardware component, etc.

As an example, the computer-readable storage medium 720 may be a high-speed RAM memory or a non-volatile memory, such as at least one disk memory. Optionally, the computer-readable storage medium 720 may also be at least one computer-readable storage medium away from the foregoing processor 710. Specifically, the computer-readable storage medium 720 includes, but is not limited to a volatile memory and/or a non-volatile memory. The non-volatile memory may be a ROM, a PROM, an Erasable PROM (EPROM), an Electrically EPROM (EEPROM), or a flash memory. The volatile memory may be a RAM used as an external cache. By way of exemplary descriptions rather than restrictive descriptions, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), a Direct Rambus RAM (DR RAM).

In an implementation, the electronic device 700 may be the encoder or the encoding framework involved in the embodiments of the disclosure; the computer-readable storage medium 720 stores a first computer instruction; the first computer instruction stored in the computer-readable storage medium 720 is loaded and executed by the processor 710, to implement corresponding operations of the encoding method provided in the embodiments of the disclosure; in other words, the first computer instruction in the computer-readable storage medium 720 is loaded by the processor 710 to execute corresponding operations, which are not elaborated here to avoid repetition.

In an implementation, the electronic device 700 may be the decoder or the decoding framework involved in the embodiments of the disclosure; the computer-readable storage medium 720 stores a second computer instruction; the second computer instruction stored in the computer-readable storage medium 720 is loaded and executed by the processor 710, to implement corresponding operations of the decoding method provided in the embodiments of the disclosure; in other words, the second computer instruction in the computer-readable storage medium 720 is loaded by the processor 710 to execute corresponding operations, which are not elaborated here to avoid repetition.

According to another aspect of the disclosure, an embodiment of the disclosure further provides an encoding and decoding system, the encoding and decoding system includes the encoder and the decoder mentioned above.

According to another aspect of the disclosure, an embodiment of the disclosure further provides a computer-readable storage medium (memory). The computer-readable storage medium is a memory device in the electronic device 700 and is configured to store programs and data, such as the computer-readable storage medium 720. It may be understood that the computer-readable storage medium 720 here may include a built-in storage medium in the electronic device 700, and of course, may also include an extended storage medium supported by the electronic device 700. The computer-readable storage medium provides a storage space, and the storage space stores an operating system of the electronic device 700. Furthermore, one or more computer instructions adapted to be loaded and executed by the processor 710 are also stored in the storage space, and these computer instructions may be one or more computer programs 721 (including program codes).

According to another aspect of the disclosure, there is provided a computer program product or a computer program, the computer program product or the computer program includes computer instructions, and the computer instructions are stored in a computer-readable storage medium, such as the computer program 721. At this time, the electronic device 700 may be a computer, the processor 710 reads the computer instructions from the computer-readable storage medium 720, and the processor 710 executes the computer instructions, so that the computer executes the encoding method or the decoding method provided in the above various optional modes.

In other words, when it is implemented with software, it may be implemented in whole or in part in form of a computer program product. The computer program product includes one or more computer instructions. When the computer program instructions are loaded and executed on the computer, the whole or part of the processes according to the embodiments of the disclosure is executed, or functions according to the embodiments of the disclosure are implemented. The computer may be a general-purpose computer, a special-purpose computer, a computer network, or other programmable devices. The computer instructions may be stored in a computer-readable storage medium, or transmitted from a computer-readable storage medium to another computer-readable storage medium. For example, the computer instructions may be transmitted from one website, computer, server or data center to another website, computer, server or data center through a wired manner (such as a coaxial cable, an optical fiber, a Digital Subscriber Line (DSL)) or a wireless manner (such as infrared, wireless, microwave, etc.).

It may be appreciated by those of ordinary skill in the art that units and process steps of each example described in combination with the embodiments disclosed here may be implemented by electronic hardware, or a combination of computer software and electronic hardware. Whether these functions are performed in hardware or software, depends on specific applications and design constraints of the technical solutions. Professional technicians may use different methods in each specific application to implement the described functions, however, such implementation should not be considered as going beyond the scope of the disclosure.

Finally, it should be noted that the above contents are only specific implementations of the disclosure, however, the scope of protection of the disclosure is not limited thereto. Variations or replacements easily conceived by any technician familiar with this technical field within the technical scope disclosed in the disclosure, should fall within the scope of protection of the disclosure. Therefore, the scope of protection of the disclosure shall be subjected to the scope of protection of the claims.

The invention claimed is:

1. An intra prediction method, applicable to a decoder, the method comprising:
    parsing a bitstream, and determining a target prediction mode of a current picture block in a current picture sequence, wherein the target prediction mode is a first prediction mode or a second prediction mode, the first prediction mode is an intra prediction mode for the decoder to derive the current picture block by using a manner of an encoder deriving the intra prediction mode, and the second prediction mode is a prediction mode combining the first prediction mode with a Matrix based Intra Prediction (MIP) mode; and
    performing intra prediction on the current picture block based on the target prediction mode, to obtain a target prediction block of the current picture block.

2. The method of claim 1, wherein determining the target prediction mode of the current picture block in the current picture sequence comprises:

parsing the bitstream to acquire a first identifier, wherein the first identifier indicates whether the first prediction mode or the second prediction mode is allowed to be used to perform intra prediction on picture blocks in the current picture sequence;

in response to the first identifier indicating that the first prediction mode or the second prediction mode is allowed to be used to perform intra prediction on the picture blocks in the current picture sequence, parsing the bitstream to acquire a second identifier, wherein the second identifier indicates whether the first prediction mode or the second prediction mode is used to perform intra prediction on the current picture block;

in response to the second identifier indicating that the first prediction mode or the second prediction mode is used to perform intra prediction on the current picture block, parsing the bitstream to acquire a third identifier, wherein the third identifier indicates an index of the first prediction mode or an index of the second prediction mode; and in response to the third identifier indicating the index of the first prediction mode, determining the first prediction mode as the target prediction mode, and in response to the third identifier indicates the index of the second prediction mode, determining the second prediction mode as the target prediction mode.

3. The method of claim 1, wherein the first prediction mode is a Decoder side Intra Mode Derivation (DIMD) prediction mode, wherein performing intra prediction on the current picture block based on the target prediction mode to obtain the target prediction block of the current picture block comprises:

calculating a gradient amplitude value corresponding to each of at least one prediction mode in a reconstruction sample area adjacent to the current picture block, wherein a prediction mode having a maximum gradient amplitude value of the at least one prediction mode is used as a third prediction mode, and a prediction mode having a maximum gradient amplitude value of the at least one prediction mode other than the third prediction mode is used as a fourth prediction mode; and performing intra prediction on the current picture block based on the third prediction mode and the fourth prediction mode, to obtain the target prediction block.

4. The method of claim 3, wherein the target prediction mode is the first prediction mode, wherein performing intra prediction on the current picture block based on the third prediction mode and the fourth prediction mode to obtain the target prediction block comprises:

in response to the third prediction mode and the fourth prediction mode not comprising a planar mode and a Direct current (DC) mode, and a gradient amplitude value of the fourth prediction mode being greater than 0, performing weighted average process on a first prediction block, a second prediction block and a third prediction block to obtain the target prediction block, wherein the first prediction block is a prediction block obtained by performing intra prediction on the current picture block based on the third prediction mode, the second prediction block is a prediction block obtained by performing intra prediction on the current picture block based on the fourth prediction mode, and the third prediction block is a prediction block obtained by performing intra prediction on the current picture block based on the planar mode; and in response to the third prediction mode and the fourth prediction mode comprising the planar mode or the DC mode, or the gradient amplitude value of the fourth prediction mode being less than or equal to 0, determining the first prediction block as the target prediction block.

5. The method of claim 4, wherein the third prediction block has a preset weight, wherein the method further comprises: before performing weighted average process on the first prediction block, the second prediction block and the third prediction block, determining a product of a first weight and a first coefficient as a weight of the first prediction block, wherein the first weight is a difference between 1 and the weight of the third prediction block, the first coefficient is a ratio of a gradient amplitude value of the third prediction mode to a first gradient amplitude value, and the first gradient amplitude value is a sum of the gradient amplitude value of the third prediction mode and the gradient amplitude value of the fourth prediction mode; and determining a product of the first weight and a second coefficient as a weight of the second prediction block, wherein the second coefficient is equal to a ratio of the gradient amplitude value of the fourth prediction mode to the first gradient amplitude value.

6. The method of claim 3, wherein the target prediction mode is the second prediction mode, wherein performing intra prediction on the current picture block based on the third prediction mode and the fourth prediction mode to obtain the target prediction block comprises:

in response to the third prediction mode and the fourth prediction mode not comprising a planar mode and a DC mode, and a gradient amplitude value of the fourth prediction mode being greater than 0, performing weighted average process on a first prediction block, a second prediction block and a fourth prediction block to obtain the target prediction block, wherein the first prediction block is a prediction block obtained by performing intra prediction on the current picture block based on the third prediction mode, the second prediction block is a prediction block obtained by performing intra prediction on the current picture block based on the fourth prediction mode, and the fourth prediction block is a prediction block obtained by performing intra prediction on the current picture block based on the MIP mode; and in response to the third prediction mode and the fourth prediction mode comprising the planar mode or the DC mode, or the gradient amplitude value of the fourth prediction mode being less than or equal to 0, determining the first prediction block as the target prediction block.

7. The method of claim 6, wherein the fourth prediction block has a preset weight, wherein the method further comprises: before performing weighted average process on the first prediction block, the second prediction block and the fourth prediction block, determining a product of a second weight and a first coefficient as a weight of the first prediction block, wherein the second weight is a difference between 1 and the weight of the fourth prediction block, the first coefficient is a ratio of a gradient amplitude value of the third prediction mode to a first gradient amplitude value, and the first gradient amplitude value is a sum of the gradient amplitude value of the third prediction mode and the gradient amplitude value of the fourth prediction mode; and determining a product of the second weight and a second coefficient as a weight of the second prediction block, wherein the second coefficient is equal to a ratio of the gradient amplitude value of the fourth prediction mode to the first gradient amplitude value.

8. The method of claim 1, wherein the first prediction mode is a Template based Intra Mode Derivation (TIMD) prediction mode, wherein performing intra prediction on the current picture block based on the target prediction mode to obtain the target prediction block of the current picture block comprises:

in response to a reconstruction sample template of the current picture block comprising reconstruction samples adjacent to the current picture block, calculating a rate distortion cost of each of at least one prediction mode, wherein a prediction mode having a minimum rate distortion cost of the at least one prediction mode is used as a fifth prediction mode; and performing intra prediction on the current picture block based on the fifth prediction mode, to obtain the target prediction block.

9. The method of claim 8, wherein the target prediction mode is the first prediction mode, wherein performing intra prediction on the current picture block based on the fifth prediction mode to obtain the target prediction block comprises:

in response to a rate distortion cost of the fifth prediction mode and a rate distortion cost of a sixth prediction mode meeting a preset ratio, performing weighted average process on a fifth prediction block and a sixth prediction block to obtain the target prediction block, wherein a prediction mode having a minimum rate distortion cost of the at least one prediction mode other than the fifth prediction mode is used as the sixth prediction mode, the fifth prediction block is a prediction block obtained by performing intra prediction on the current picture block based on the fifth prediction mode, and the sixth prediction block is a prediction block obtained by performing intra prediction on the current picture block based on the sixth prediction mode; and in response to the rate distortion cost of the fifth prediction mode and the rate distortion cost of the sixth prediction mode not meeting the preset ratio, determining the fifth prediction block as the target prediction block.

10. The method of claim 9, further comprising:

in response to the reconstruction sample template of the current picture block not comprising reconstruction samples adjacent to the current picture block, determining a prediction block obtained by performing intra prediction on the current picture block based on a planar mode as the target prediction block.

11. The method of claim 9, further comprising: before performing weighted average process on the fifth prediction block and the sixth prediction block, determining a product of a third weight and a third coefficient as a weight of the fifth prediction block, wherein the third weight is a ratio of the rate distortion cost of the fifth prediction mode to a first rate distortion cost, and the first rate distortion cost is a sum of the rate distortion cost of the fifth prediction mode and the rate distortion cost of the sixth prediction mode; and determining a difference between 1 and the third weight as a weight of the sixth prediction block.

12. The method of claim 8, wherein the target prediction mode is the second prediction mode, wherein performing intra prediction on the current picture block based on the fifth prediction mode to obtain the target prediction block comprises:

performing weighted average process on a fifth prediction block and a seventh prediction block to obtain the target prediction block, wherein the fifth prediction block is a prediction block obtained by performing intra prediction on the current picture block based on the fifth prediction mode, and the seventh prediction block is a prediction block obtained by performing intra prediction on the current picture block based on the MIP mode.

13. The method of claim 12, wherein each of the fifth prediction block and the seventh prediction block has a preset weight.

14. The method of claim 1, wherein the MIP mode has a preset index.

15. An intra prediction method, applicable to an encoder, the method comprising:

determining a target prediction mode of a current picture block in a current picture sequence, wherein the target prediction mode is a first prediction mode or a second prediction mode, the first prediction mode is an intra prediction mode for a decoder to derive the current picture block by using a manner of the encoder deriving the intra prediction mode, and the second prediction mode is a prediction mode combining the first prediction mode with a Matrix based Intra Prediction (MIP) mode; and performing intra prediction on the current picture block based on the target prediction mode, to obtain a target prediction block of the current picture block.

16. The method of claim 15, wherein determining the target prediction mode of the current picture block in the current picture sequence comprises:

acquiring a first identifier, wherein the first identifier indicates whether the first prediction mode or the second prediction mode is allowed to be used to perform intra prediction on picture blocks in the current picture sequence;

in response to the first identifier indicating that the first prediction mode or the second prediction mode is allowed to be used to perform intra prediction on the picture blocks in the current picture sequence, determining a rate distortion cost of the first prediction mode and a rate distortion cost of the second prediction mode; and determining a prediction mode having a minimum rate distortion cost of the first prediction mode and the second prediction mode as the target prediction mode.

17. The method of claim 16, further comprising:

encoding the current picture sequence based on the target prediction block, the first identifier, a second identifier and a third identifier, to obtain a bitstream of the current picture sequence, wherein the second identifier indicates whether the first prediction mode or the second prediction mode is used to perform intra prediction on the current picture block, and the third identifier indicates an index of the first prediction mode or an index of the second prediction mode.

18. The method of claim 16, wherein the first prediction mode is a Decoder side Intra Mode Derivation (DIMD) prediction mode, wherein determining the rate distortion cost of the first prediction mode and the rate distortion cost of the second prediction mode comprises:

calculating a gradient amplitude value corresponding to each of at least one prediction mode in a reconstruction sample area adjacent to the current picture block, wherein a prediction mode having a maximum gradient amplitude value of the at least one prediction mode is used as a third prediction mode, and a prediction mode having a maximum gradient amplitude value of the at least one prediction mode other than the third prediction mode is used as a fourth prediction mode; and determining the rate distortion cost of the first prediction mode and the rate distortion cost of the second prediction mode based on the third prediction mode and the fourth prediction mode.

19. The method of claim 18, wherein determining the rate distortion cost of the first prediction mode and the rate distortion cost of the second prediction mode based on the third prediction mode and the fourth prediction mode comprises:

in response to the third prediction mode and the fourth prediction mode not comprising a planar mode and a Direct current (DC) mode, and a gradient amplitude value of the fourth prediction mode being greater than 0, performing weighted average process on a first prediction block, a second prediction block and a third prediction block to obtain the target prediction block, wherein the first prediction block is a prediction block obtained by performing intra prediction on the current picture block based on the third prediction mode, the second prediction block is a prediction block obtained by performing intra prediction on the current picture block based on the fourth prediction mode, and the third prediction block is a prediction block obtained by performing intra prediction on the current picture block based on the planar mode;

in response to the third prediction mode and the fourth prediction mode comprising the planar mode or the DC mode, or the gradient amplitude value of the fourth prediction mode being less than or equal to 0, determining the first prediction block as the target prediction block; and determining a rate distortion cost of the target prediction block as the rate distortion cost of the first prediction mode.

20. A decoder, comprising:

a parser, configured to parse a bitstream, and determine a target prediction mode of a current picture block in a current picture sequence, wherein the target prediction mode is a first prediction mode or a second prediction mode, the first prediction mode is an intra prediction mode for the decoder to derive the current picture block by using a manner of an encoder deriving the intra prediction mode, and the second prediction mode is a prediction mode combining the first prediction mode with a Matrix based Intra Prediction (MIP) mode; and a predictor, configured to perform intra prediction on the current picture block based on the target prediction mode, to obtain a target prediction block of the current picture block.

* * * * *